US011736668B2

(12) United States Patent
Katz

(10) Patent No.: US 11,736,668 B2
(45) Date of Patent: *Aug. 22, 2023

(54) ARTISTIC EFFECTS FOR IMAGES AND VIDEOS

(71) Applicant: Snap Inc., Santa Monica, CA (US)

(72) Inventor: Sagi Katz, Yokneam Ilit (IL)

(73) Assignee: Snap Inc., Santa Monica, CA (US)

( * ) Notice: Subject to any disclaimer, the term of this patent is extended or adjusted under 35 U.S.C. 154(b) by 11 days.

This patent is subject to a terminal disclaimer.

(21) Appl. No.: 17/498,140

(22) Filed: Oct. 11, 2021

(65) Prior Publication Data

US 2022/0030204 A1    Jan. 27, 2022

Related U.S. Application Data

(63) Continuation of application No. 16/659,677, filed on Oct. 22, 2019, now Pat. No. 11,146,763.

(Continued)

(51) Int. Cl.
*H04N 9/31* (2006.01)
*G02B 27/01* (2006.01)
*G06F 1/16* (2006.01)

(52) U.S. Cl.
CPC ....... *H04N 9/3114* (2013.01); *G02B 27/0172* (2013.01); *G06F 1/1643* (2013.01); *H04N 9/3155* (2013.01); *H04N 9/3182* (2013.01); *H04N 9/3185* (2013.01); *G02B 2027/0178* (2013.01)

(58) Field of Classification Search
CPC .. H04N 9/3114; H04N 9/3155; H04N 9/3182; H04N 9/3185; H04N 9/3173; G02B 27/0172; G02B 2027/0178; G02B 2027/011; G02B 2027/0138;

(Continued)

(56) References Cited

U.S. PATENT DOCUMENTS 6,226,396 B1 * 5/2001 Marugame ......... G06K 9/00228
382/154
6,674,892 B1 * 1/2004 Melen ...................... G06K 9/03
348/42

(Continued)

FOREIGN PATENT DOCUMENTS

WO       2013081415 A1    6/2013
WO    WO 2013081415    *    6/2013    ............. G06T 13/00

*Primary Examiner* — Said Broome
*Assistant Examiner* — Donna J. Ricks
(74) *Attorney, Agent, or Firm* — Culhane Meadows PLLC; Stephen J. Weed

(57) ABSTRACT

A photo filter (e.g., artistic) light field effect system comprises an eyewear device that includes a frame, a temple connected to a lateral side of the frame, and a depth-capturing camera. Execution of programming by a processor configures the photo filter light field effect system to apply a photo filter selection to: (i) a left raw image or a left processed image to create a left photo filter image, and (ii) a right raw image or a right processed image to create a right photo filter image. The photo filter light field effect system generates, a photo filter light field effect image with an appearance of a spatial rotation or movement, by blending together the left photo filter image and the right photo filter image based on a left image disparity map and a right image disparity map.

20 Claims, 28 Drawing Sheets
(11 of 28 Drawing Sheet(s) Filed in Color)

Related U.S. Application Data

(60) Provisional application No. 62/753,547, filed on Oct. 31, 2018.

(58) Field of Classification Search
CPC .......... G02B 27/0093; G02B 2027/014; G06F 1/1643; G06F 3/03547; G06F 3/04883
See application file for complete search history.

(56) References Cited

U.S. PATENT DOCUMENTS

| | | | | |
|---|---|---|---|---|
| 8,300,086 | B2* | 10/2012 | Pockett | H04N 13/246 |
| | | | | 348/42 |
| 9,674,504 | B1* | 6/2017 | Salvagnini | G06K 9/4604 |
| 10,528,243 | B2* | 1/2020 | Manzari | H04N 5/23216 |
| 10,547,828 | B2 | 1/2020 | Jannard | |
| 11,146,763 | B1 | 10/2021 | Katz | |
| 2009/0154762 | A1* | 6/2009 | Choi | G06T 11/60 |
| | | | | 382/100 |
| 2014/0119672 | A1* | 5/2014 | Ioffe | G06K 9/40 |
| | | | | 382/260 |
| 2014/0368625 | A1* | 12/2014 | Lin | H04N 13/341 |
| | | | | 348/60 |
| 2016/0063670 | A1* | 3/2016 | Wilensky | H04N 5/23277 |
| | | | | 348/578 |
| 2018/0198990 | A1* | 7/2018 | Greenberger | G10L 25/57 |
| 2018/0357670 | A1* | 12/2018 | DeLuca | G06K 9/6201 |

* cited by examiner

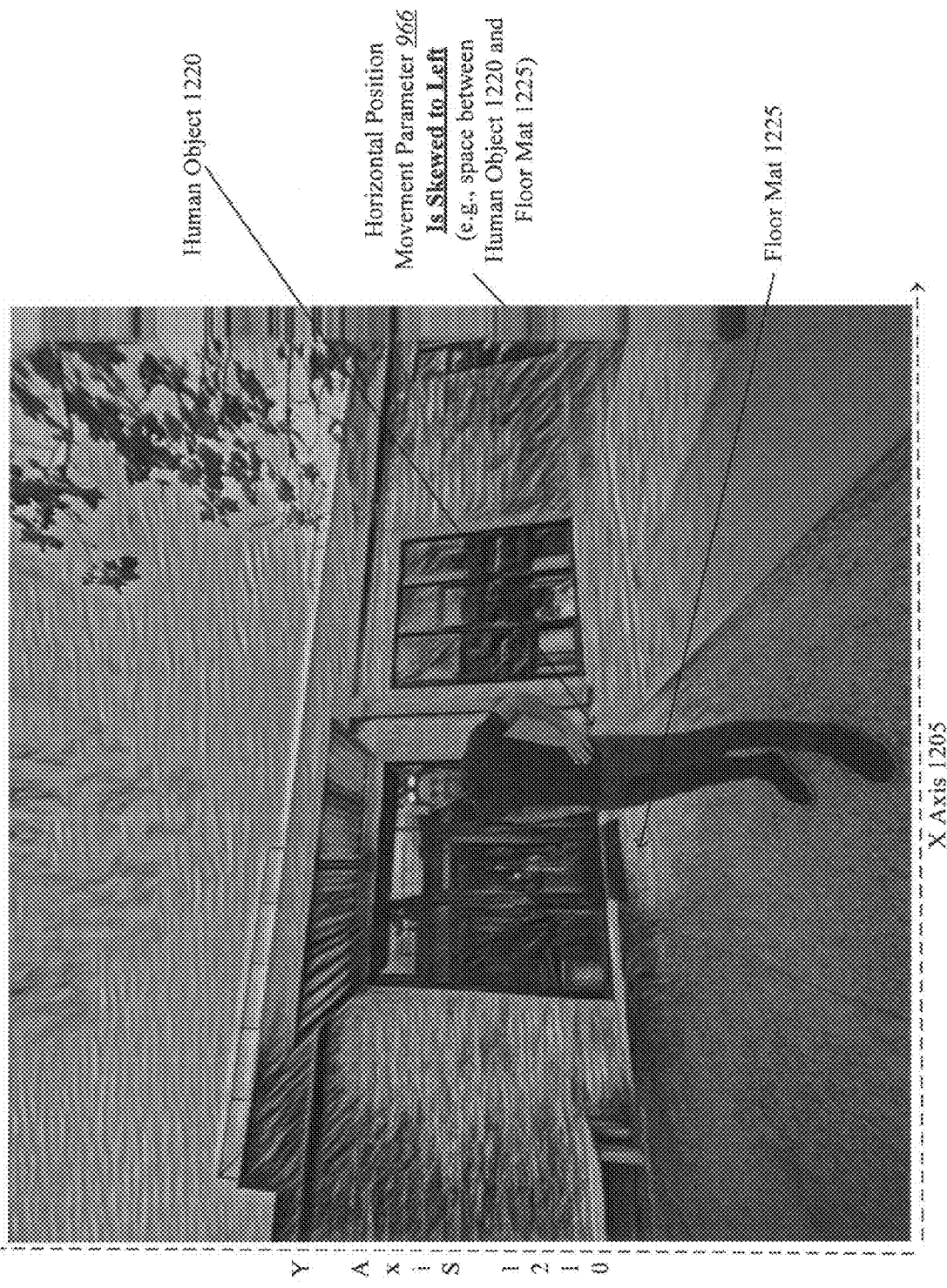

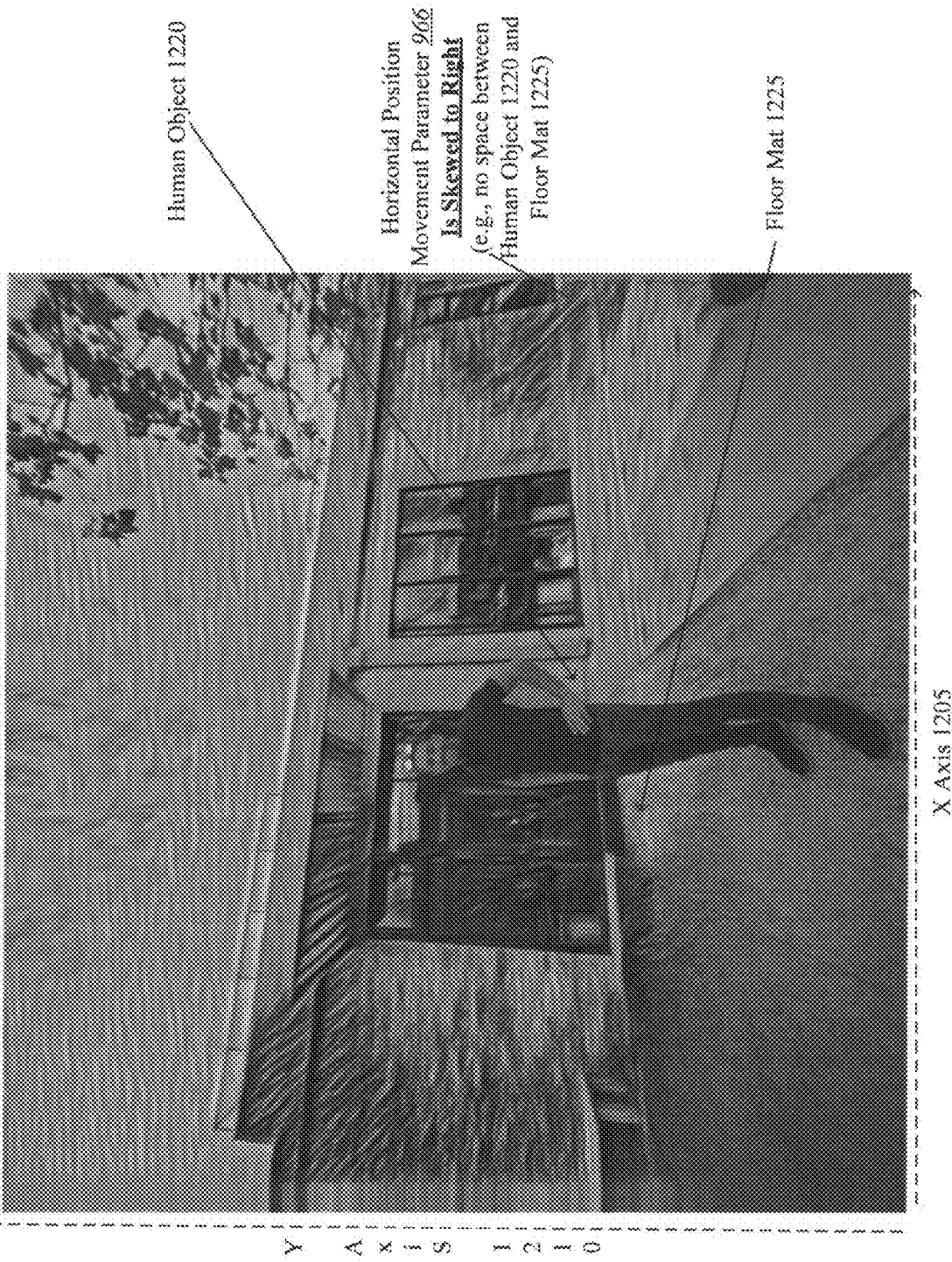

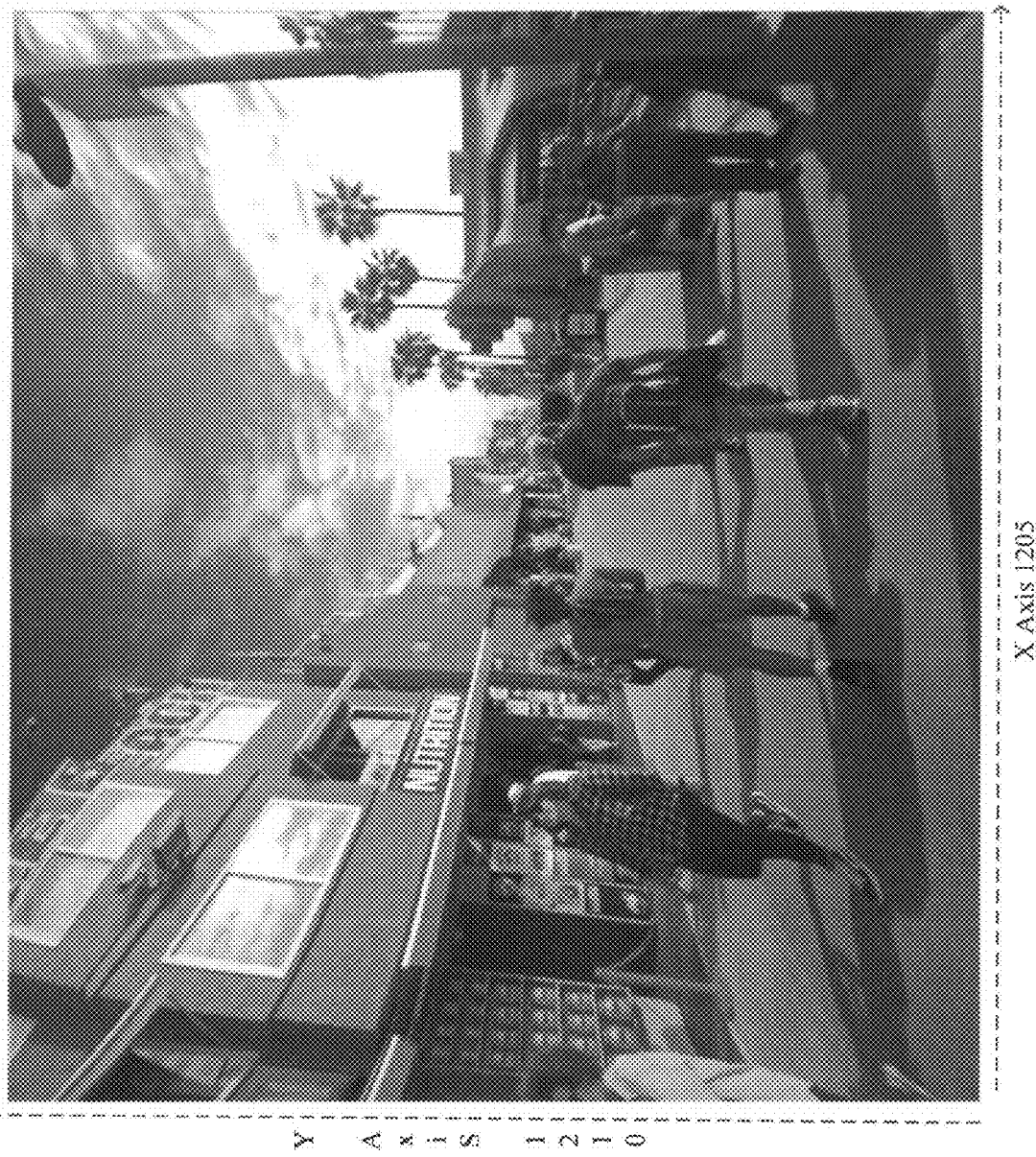

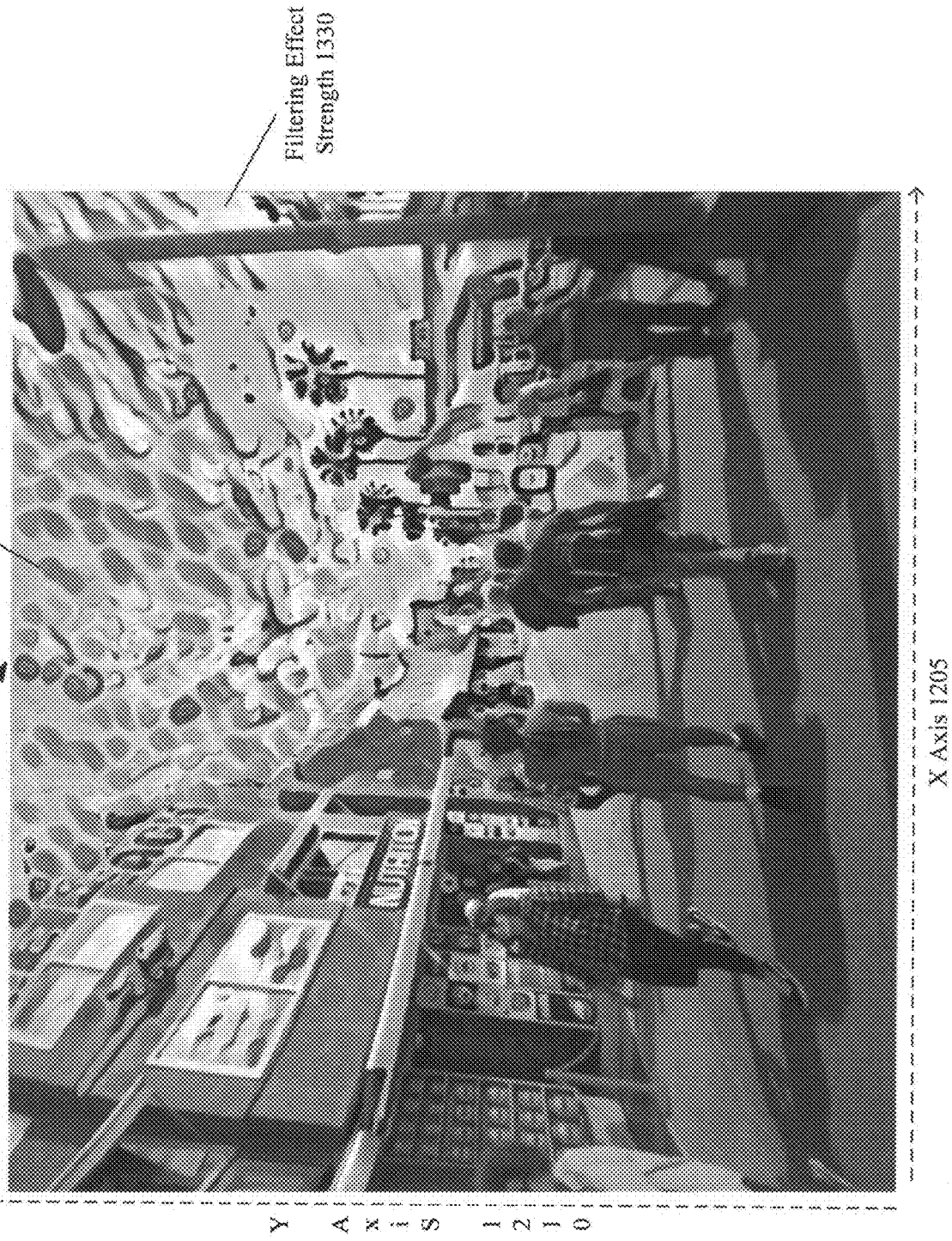

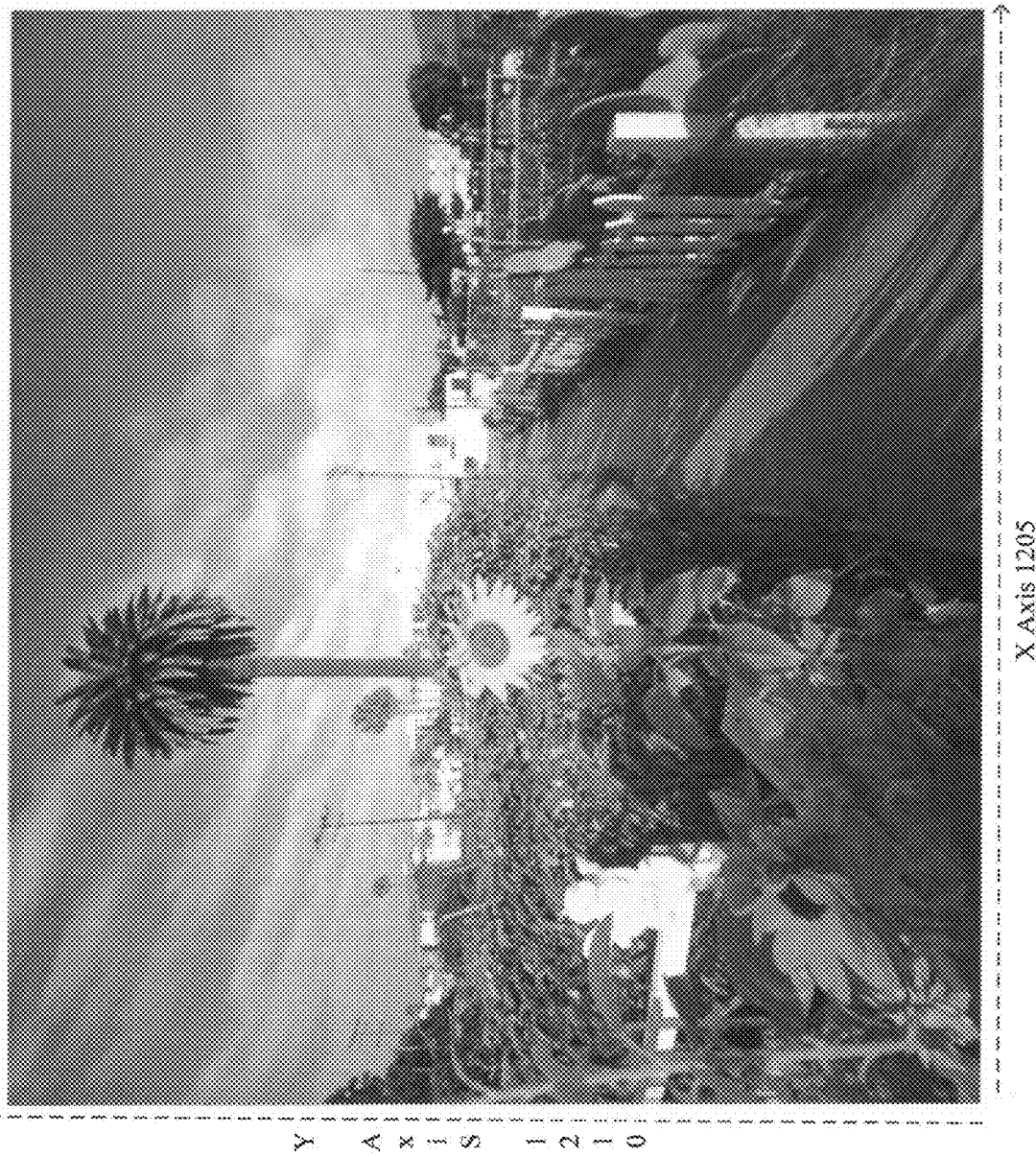
FIG. 14A  Original Image 957C

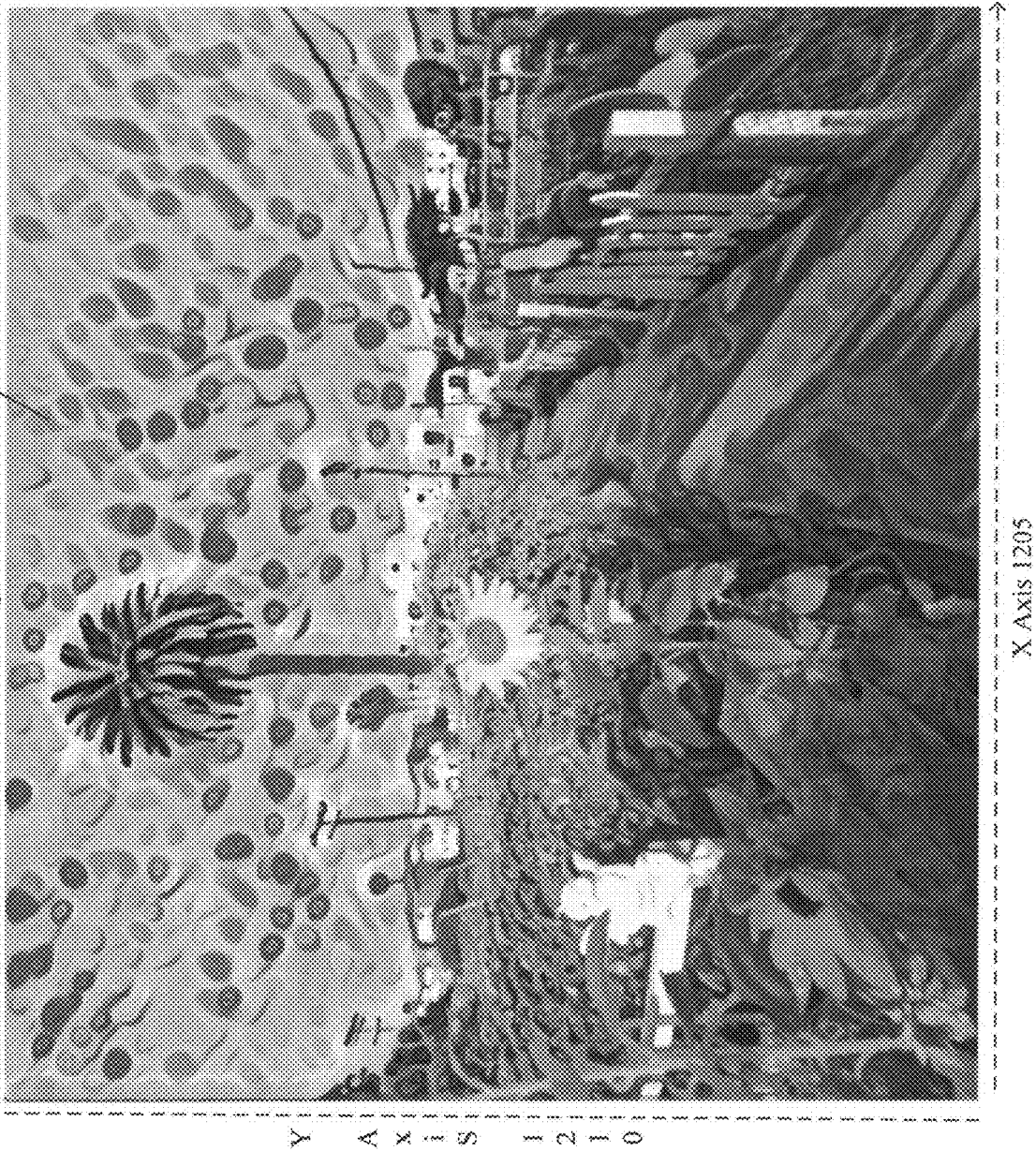

ARTISTIC EFFECTS FOR IMAGES AND VIDEOS

CROSS-REFERENCE TO RELATED APPLICATIONS

This application is a continuation of U.S. patent application Ser. No. 16/659,677 filed on Oct. 22, 2019, and claims priority to U.S. Provisional Application Ser. No. 62/753,547 filed on Oct. 31, 2018, the contents of both of which are incorporated fully herein by reference.

TECHNICAL FIELD

The present subject matter relates to wearable devices, e.g., eyewear devices, and mobile devices and techniques to allow a user to apply light field effects on photo filtered images.

BACKGROUND

Computing devices, such as wearable devices, including portable eyewear devices (e.g., smartglasses, headwear, and headgear); mobile devices (e.g., tablets, smartphones, and laptops); and personal computers available today integrate image displays and cameras. Currently, users of computing devices can utilize photo filters or lenses to create effects on a two-dimensional (2D) photograph. Various photo decorating applications feature tools like stickers, emojis, and captions to edit the two-dimensional photograph.

With the advent of three-dimensional (3D) image and video content, users expect more sophisticated manipulations and interactions to transform videos, pictures, etc. However, processing 3D image models can be computationally expensive and complex compared to 2D image processing. Hence, being able to create 3D like graphical effects in two-dimensional images and videos that are actually displayed and presented to the user is desirable. Accordingly, a need exists to enhance 3D like graphical effects available for the presented two-dimensional images and videos in a computationally efficient manner.

BRIEF DESCRIPTION OF THE DRAWINGS

The patent application file contains at least one drawing executed in color. Copies of this patent or patent application publication with color drawing(s) will be provided by the Office upon request and payment of the necessary fee.

The drawing figures depict one or more implementations, by way of example only, not by way of limitations. In the figures, like reference numerals refer to the same or similar elements.

FIG. 12A illustrates an example of a first presented original image, which is a processed (e.g., rectified) image.

FIG. 12B illustrates an example of a photo filter (e.g., artistic effect) image created from the first presented original image of FIG. 12A.

FIG. 12C illustrates an example of a first photo filter (e.g., artistic) light field effect image generated from the photo filter image of FIG. 12B, in which the spatial movement or rotation is skewed to the left.

FIG. 12D illustrates an example of a second photo filter (e.g., artistic) light field effect image generated from the photo filter image of FIG. 12B, in which the spatial movement or rotation is skewed to the right.

FIG. 13A illustrates an example of a second presented original image, which is a processed (e.g., rectified) image.

FIG. 13B illustrates an example of a first photo filter (e.g., artistic effect) image created from the second presented original image of FIG. 13A by varying a filtering effect strength based on depth.

FIG. 14A illustrates an example of a third presented original image, which is a processed (e.g., rectified) image.

FIG. 14B illustrates an example of a photo filter (e.g., artistic effect) image created from the third presented original image of FIG. 14A by varying a filtering effect strength based on depth.

DETAILED DESCRIPTION

Figure 1A:
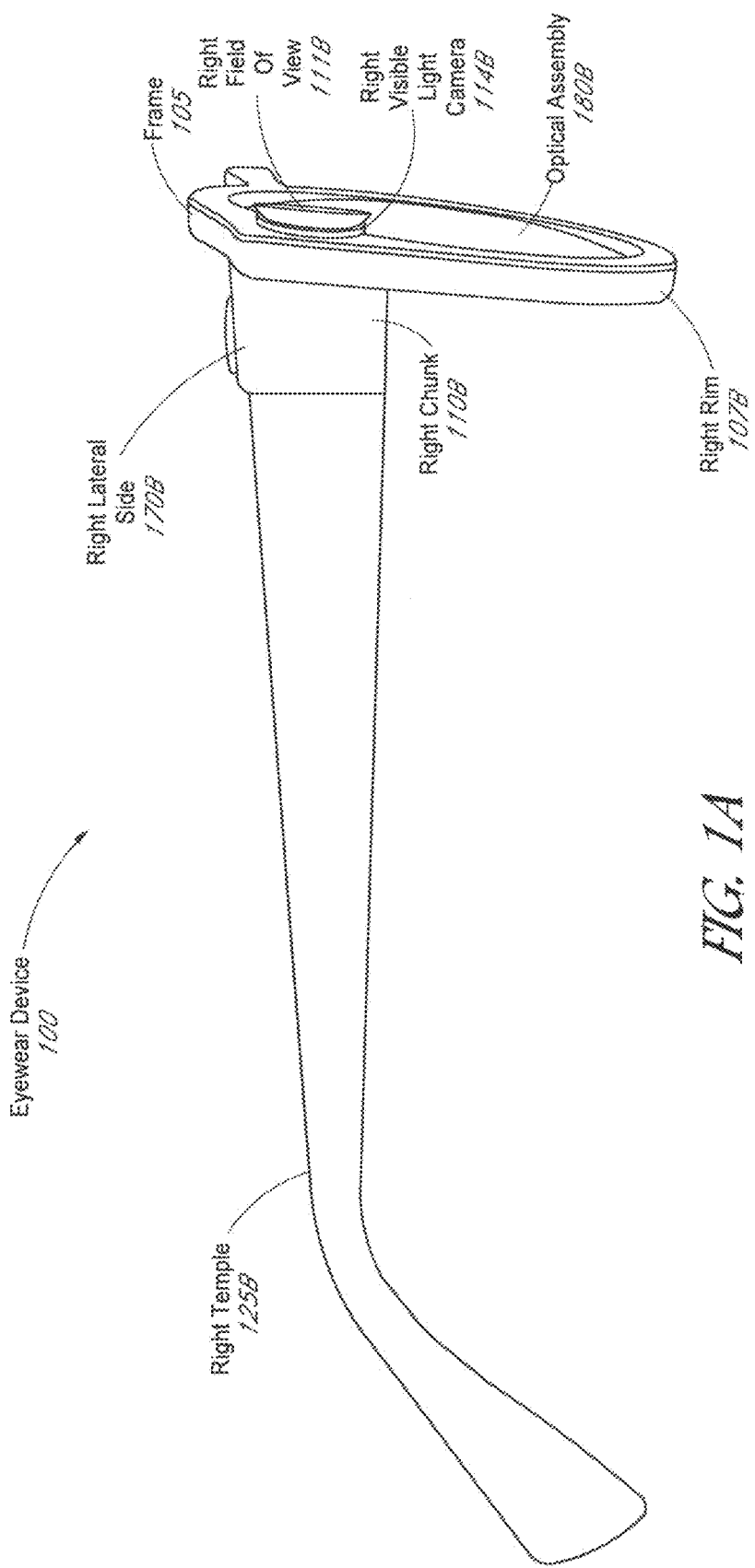
FIG. 1A is a right side view of an example hardware configuration of an eyewear device utilized in a photo filter (e.g., artistic) light field effect system, in which a photo filter selection from a user is applied to raw images or processed images to generate a photo filter light field effect image.

In the following detailed description, numerous specific details are set forth by way of examples in order to provide a thorough understanding of the relevant teachings. However, it should be apparent to those skilled in the art that the present teachings may be practiced without such details. In other instances, description of well-known methods, procedures, components, and circuitry are set forth at a relatively high-level, without detail, in order to avoid unnecessarily obscuring aspects of the present teachings.

As used herein, the term "photo filter" or "photo lens" means a graphical effect that edits, alters, or changes a photograph or picture to transform certain pixels by applying, for example: popular art (e.g., paintings, such as Andy Warhol's painting of Marilyn Monroe and The Scream, 1893 by Evard Munch, etc.) or style transfer that uses a deep neural network to learn style from a paining; graphics (e.g., hats, beards, jewelry, photo frames, stickers, and graphic overlays); texture; light saturation; chromatic exposure; colors; sharpness; themes (sepia, dramatic, nostalgic, grayscale, black and white, retro, disco, color fantasy, and vignettes); and image quality enhancement (brightness, contrast, saturation, blur, etc.). The term "artistic effect" means editing or changing a photograph or picture by applying the popular art or style transfer types of photo filter or photo lens.

Generally, the term "light field" means radiance at a point in a given direction. The term "light field effect" means rendering a different view of a scene of image(s) to provide an appearance of spatial movement or rotation as if the observer is viewing the scene from a different angle or perspective. The term "photo filter light field effect" means rendering a different view of a photo filter scene of photo filter image(s) to provide an appearance of spatial movement or rotation as if the observer is viewing the photo filter scene from a different angle or perspective. The term "artistic light field effect" means rendering a different view of an artistic effect scene of artistic effect image(s) to provide an appearance of spatial movement or rotation as if the observer is viewing the artistic effect scene from a different angle or perspective.

Light field effect cameras can capture light from different directions and move around to create a scene in three or four dimensions (e.g., using multiple lenses). However, such processing in three-dimensional (X, Y, and Z) and four-dimensional space (X, Y, Z, and time) is relatively complex and can be computationally intensive. As described herein, two visible light cameras 114A-B can be used to create a simplified light field effect from two images by operating in two-dimensional space only, which is less computationally intensive.

The term "coupled" or "connected" as used herein refers to any logical, optical, physical or electrical connection, link or the like by which electrical or magnetic signals produced or supplied by one system element are imparted to another coupled or connected element. Unless described otherwise, coupled or connected elements or devices are not necessarily directly connected to one another and may be separated by intermediate components, elements or communication media that may modify, manipulate or carry the electrical signals. The term "on" means directly supported by an element or indirectly supported by the element through another element integrated into or supported by the element.

The orientations of the eyewear device, associated components and any complete devices incorporating a depth-capturing camera such as shown in any of the drawings, are given by way of example only, for illustration and discussion purposes. In operation for photo filtering (e.g., artistic) light field effects, the eyewear device may be oriented in any other direction suitable to the particular application of the eyewear device, for example up, down, sideways, or any other orientation. Also, to the extent used herein, any directional term, such as front, rear, inwards, outwards, towards, left, right, lateral, longitudinal, up, down, upper, lower, top, bottom, side, horizontal, vertical, and diagonal are used by way of example only, and are not limiting as to direction or orientation of any depth-capturing camera or component of the depth-capturing camera constructed as otherwise described herein.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

FIG. 1A is a right side view of an example hardware configuration of an eyewear device 100 utilized in a photo filter (e.g., artistic) light field effect system, which shows a right visible light camera 114B of a depth-capturing camera to generate a depth image. As further described below, in the photo filter (e.g., artistic) light field effect system, a photo filter selection input from a user is applied to raw images or processed images to create photo filter image(s) with a photo filter scene. The photo filter image(s) can be blended together based on disparity map(s) to create a photo filter light field effect image. The photo filter light field effect image provides an appearance of spatial movement or rotation around the photo filter scene of the photo filter image(s). In one example, the type of photo filter is an artistic effect. Hence, in this example, an artist effect selection input from the user is applied to raw images or processed images to create artistic effect image(s), which are then blended together to generate an artistic light field effect image with the artistic effect scene. The artistic light field effect image provides an appearance of spatial movement or rotation around the artistic effect scene of the artistic effect image(s).

Figure 1B:
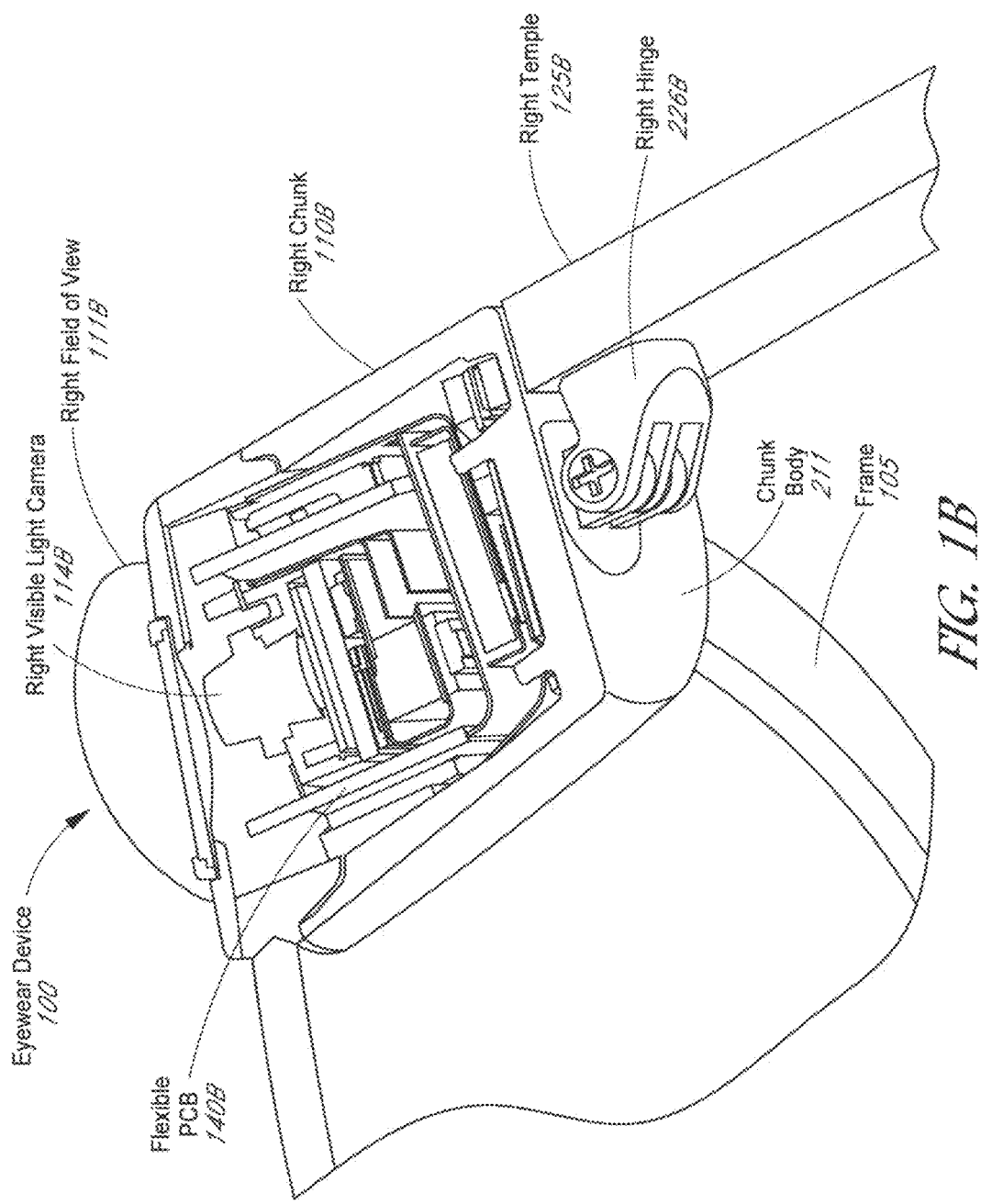
FIG. 1B is a top cross-sectional view of a right chunk of the eyewear device of FIG. 1A depicting a right visible light camera of a depth-capturing camera, and a circuit board.
Figure 1C:
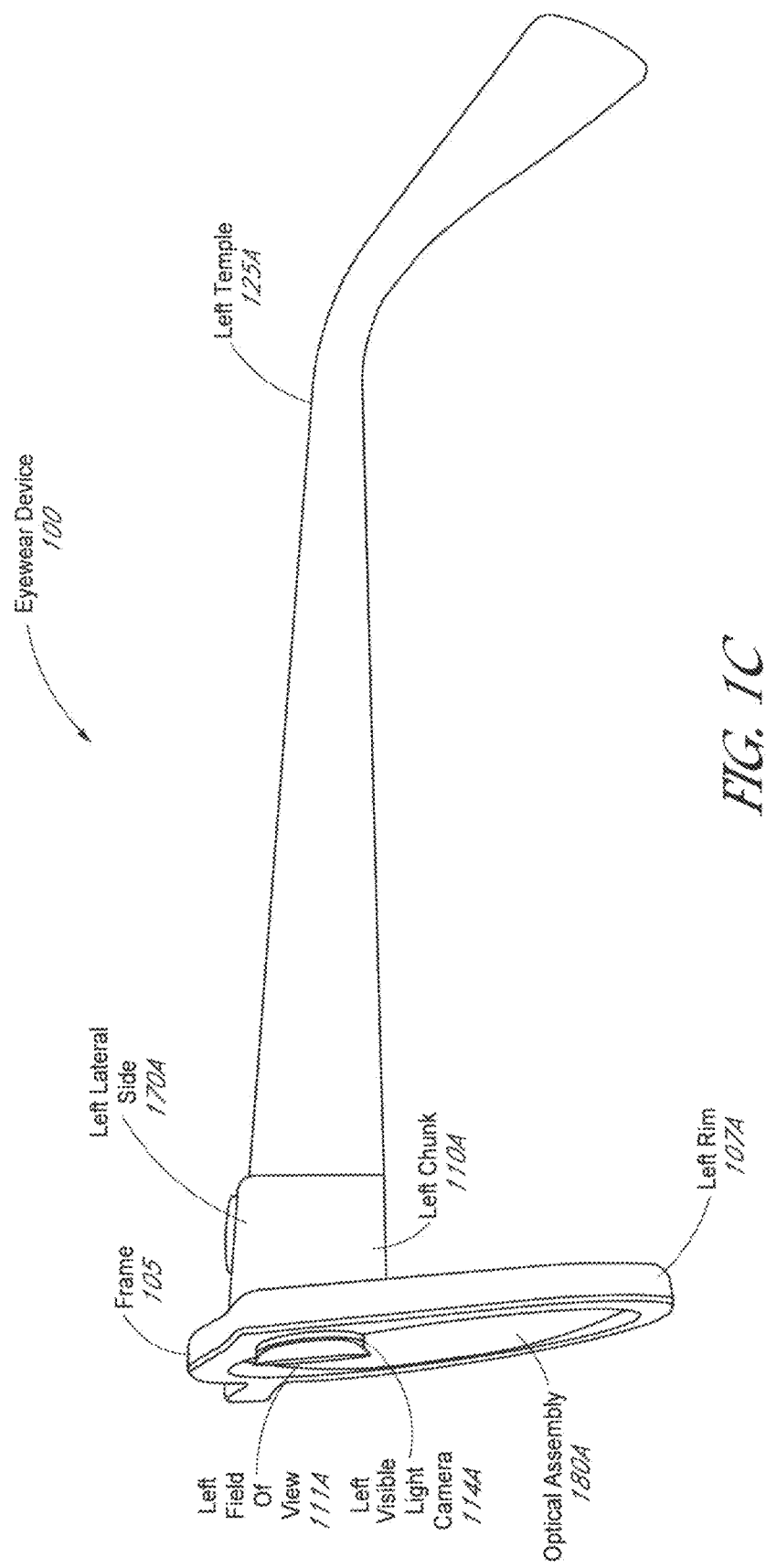
FIG. 1C is a left side view of an example hardware configuration of an eyewear device of FIG. 1A, which shows a left visible light camera of the depth-capturing camera.
Figure 1D:
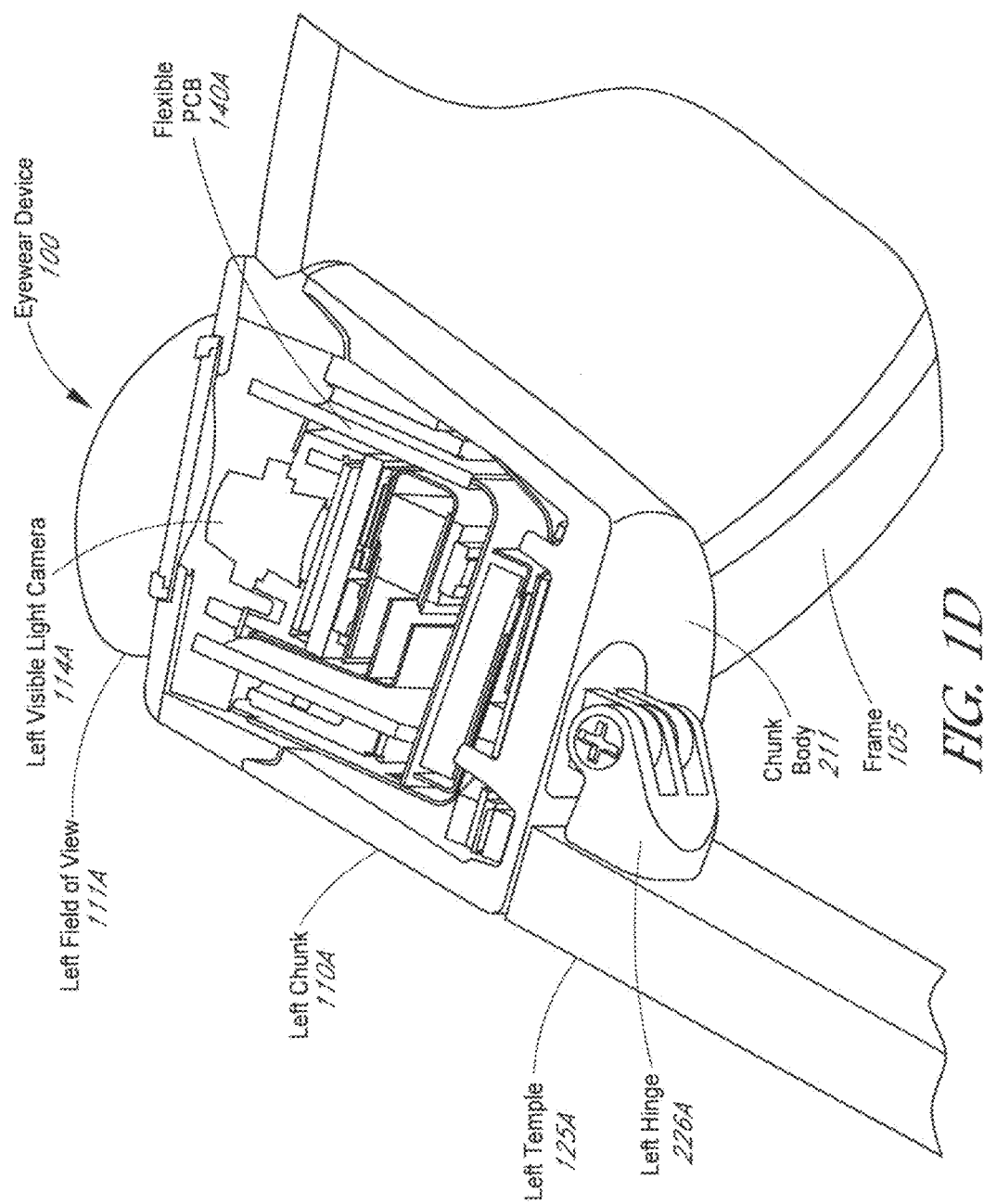
FIG. 1D is a top cross-sectional view of a left chunk of the eyewear device of FIG. 1C depicting the left visible light camera of the depth-capturing camera, and the circuit board.

Eyewear device 100, includes a right optical assembly 180B with an image display to present images, such as an original image based on a left raw image, a processed left image, a right raw image, a processed right image, the photo filtered image (e.g., the artistic effect image), or the photo filtered light field effect image (e.g., the artistic light field effect image). As shown in FIGS. 1A-B, the eyewear device 100 includes the right visible light camera 114B. Eyewear device 100 can include multiple visible light cameras 114A-B that form a passive type of depth-capturing camera, such as stereo camera, of which the right visible light camera 114B is located on a right chunk 110B. As shown in FIGS. 1C-D, the eyewear device 100 can also include a left visible light camera 114A. Alternatively, in the example of FIG. 2A, the depth-capturing camera can be an active type of depth-capturing camera that includes a single visible light camera 114B and a depth sensor (see element 213 of FIG. 2A).

Left and right visible light cameras 114A-B are sensitive to the visible light range wavelength. Each of the visible light cameras 114A-B have a different frontward facing field of view which are overlapping to allow three-dimensional depth images to be generated, for example, right visible light camera 114B has the depicted right field of view 111B. Generally, a "field of view" is the part of the scene that is visible through the camera at a particular position and orientation in space. Objects or object features outside the field of view 111A-B when the image is captured by the visible light camera are not recorded in a raw image (e.g., photograph or picture). The field of view describes an angle range or extent which the image sensor of the visible light camera 114A-B picks up electromagnetic radiation of a given scene in a captured image of the given scene. Field of view can be expressed as the angular size of the view cone, i.e., an angle of view. The angle of view can be measured horizontally, vertically, or diagonally.

In an example, visible light cameras 114A-B have a field of view with an angle of view between 15° to 30°, for example 24°, and have a resolution of 480×480 pixels. The "angle of coverage" describes the angle range that a lens of visible light cameras 114A-B or infrared camera 220 (see FIG. 2A) can effectively image. Typically, the image circle produced by a camera lens is large enough to cover the film or sensor completely, possibly including some vignetting toward the edge. If the angle of coverage of the camera lens does not fill the sensor, the image circle will be visible, typically with strong vignetting toward the edge, and the effective angle of view will be limited to the angle of coverage.

Examples of such visible lights camera 114A-B include a high-resolution complementary metal-oxide-semiconductor (CMOS) image sensor and a video graphic array (VGA) camera, such as 640 p (e.g., 640×480 pixels for a total of 0.3 megapixels), 720 p, or 1080 p. As used herein, the term "overlapping" when referring to field of view means the matrix of pixels in the generated raw image(s) or infrared image of a scene overlap by 30% or more. As used herein, the term "substantially overlapping" when referring to field of view means the matrix of pixels in the generated raw image(s) or infrared image of a scene overlap by 50% or more.

Image sensor data from the visible light cameras 114A-B are captured along with geolocation data, digitized by an image processor, and stored in a memory. The captured left and right raw images captured by respective visible light cameras 114A-B are in the two-dimensional space domain and comprise a matrix of pixels on a two-dimensional coordinate system that includes an X axis for horizontal position and a Y axis for vertical position. Each pixel includes a color attribute (e.g., a red pixel light value, a green pixel light value, and/or a blue pixel light value); and a position attribute (e.g., an X location coordinate and a Y location coordinate).

To provide stereoscopic vision, visible light cameras 114A-B may be coupled to an image processor (element 912 of FIG. 9) for digital processing along with a timestamp in which the image of the scene is captured. Image processor 912 includes circuitry to receive signals from the visible light cameras 114A-B and process those signals from the visible light camera 114 into a format suitable for storage in the memory. The timestamp can be added by the image processor or other processor, which controls operation of the visible light cameras 114A-B. Visible light cameras 114A-B allow the depth-capturing camera to simulate human binocular vision. Depth-capturing camera provides the ability to reproduce three-dimensional images based on two captured images from the visible light cameras 114A-B having the same timestamp. Such three-dimensional images allow for an immersive life-like experience, e.g., for virtual reality or video gaming.

For stereoscopic vision, a pair of raw red, green, and blue (RGB) images are captured of a scene at a given moment in time—one image for each of the left and right visible light cameras 114A-B (e.g., stereo pairs). When the pair of captured raw images from the frontward facing left and right field of views 111A-B of the left and right visible light cameras 114A-B are processed (e.g., by the image processor), depth images are generated. Depth images can be based on a three-dimensional model that can include a three-dimensional mesh (e.g., triangulated mesh) and textures, which are uploaded to a graphics processing unit (GPU) as vertices along with texture mapping. Usually, the depth is not actually seen, but the effect of depth can be seen in the rendered and displayed two-dimensional images. The generated depth images can be transformed to be perceived by a user on the optical assembly 180A-B or other image display(s) (e.g., of a mobile device) by transforming those depth images into various viewpoints that are two-dimensional images for display. The generated depth images are in the three-dimensional space domain and can comprise a matrix of vertices on a three-dimensional location coordinate system that includes an X axis for horizontal position (e.g., length), a Y axis for vertical position (e.g., height), and a Z axis for depth (e.g., distance). Each vertex includes a position attribute (e.g., a red pixel light value, a green pixel light value, and/or a blue pixel light value); a position attribute (e.g., an X location coordinate, a Y location coordinate, and a Z location coordinate); a texture attribute, and/or a reflectance attribute. The texture attribute quantifies the perceived texture of the depth image, such as the spatial arrangement of color or intensities in a region of vertices of the depth image.

Generally, perception of depth arises from the disparity of a given 3D point in the left and right raw images captured by visible light cameras 114A-B. Disparity is the difference in image location of the same 3D point when projected under perspective of the visible light cameras 114A-B ($d = x_{left} - x_{right}$). Correlation of the left and right pixels in the respective left and right raw images can be achieved with Semi-Global Block Matching (SGBM), for example. For visible light cameras 114A-B with parallel optical axes, focal length f, baseline b, and corresponding image points ($x_{left}$, $y_{left}$) and ($x_{right}$, $y_{right}$), the location of a 3D point (Z axis location coordinate) can be derived utilizing triangulation which determines depth from disparity. Typically, depth of the 3D point is inversely proportional to disparity. A variety of other techniques can also be used. Generation of three-dimensional depth images and photo filter (e.g., artistic) light field effect images is explained in more detail later.

In an example, a photo filter (e.g., artistic) light field effect system includes the eyewear device 100. The eyewear device 100 includes a frame 105 and a left temple 110A extending from a left lateral side 170A of the frame 105 and a right temple 110B extending from a right lateral side 170B of the frame 105. Eyewear device 100 further includes a depth-capturing camera. The depth-capturing camera includes: (i) at least two visible light cameras with overlapping fields of view; or (ii) a least one visible light camera 114A-B and a depth sensor (element 213 of FIG. 2A). In one example, the depth-capturing camera includes a left visible light camera 114A with a left field of view 111A connected to the frame 105 or the left temple 110A to capture a left image of the scene. Eyewear device 100 further includes a right visible light camera 114B connected to the frame 105 or the right temple 110B with a right field of view 111B to capture (e.g., simultaneously with the left visible light camera 114A) a right image of the scene which partially overlaps the left image.

Photo filter (e.g., artistic) light field effect system further includes a computing device, such as a host computer (e.g., mobile device 990 of FIGS. 9-10) coupled to eyewear device 100 over a network. The photo filter (e.g., artistic) light field effect system, further includes an image display (optical assembly 180A-B of eyewear device; image display 1080 of mobile device 990 of FIG. 10) for presenting (e.g., displaying) a sequence of images. The sequence of images includes the original images, raw images or processed raw images in two-dimensional space (e.g., after rectification), photo filter (e.g., artistic effect) images, and photo filter (e.g., artistic) light field effect images. Photo filter (e.g., artistic) light field effect system further includes an image display driver (element 942 of eyewear device 100 of FIG. 9; element 1090 of mobile device 990 of FIG. 10) coupled to the image display (optical assembly 180A-B of eyewear device; image display 1080 of mobile device 990 of FIG. 10) to control the image display to present the sequence of images. The sequence of images can include the original images, such as the raw images or processed raw images in two-dimensional space (e.g., after rectification), photo filter (e.g., artistic effect) images, and photo filter (e.g., artistic) light field effect images.

Photo filter (e.g., artistic) light field effect system further includes a user input device to receive a two-dimensional input selection from a user. Examples of user input devices include a touch sensor (element 991 of FIG. 9 for the eyewear device 100), a touch screen display (element 1091 of FIG. 10 for the mobile device 1090), and a computer mouse for a personal computer or a laptop computer. Photo filter (e.g., artistic) light field effect system further includes a processor (element 932 of eyewear device 100 of FIG. 9; element 1030 of mobile device 990 of FIG. 10) coupled to the eyewear device 100 and the depth-capturing camera. Photo filter (e.g., artistic) light field effect system further includes a memory (element 934 of eyewear device 100 of FIG. 9; elements 1040A-B of mobile device 990 of FIG. 10) accessible to the processor, and photo filter (e.g., artistic) light field effect programming in the memory (element 945 of eyewear device 100 of FIG. 9; element 945 of mobile device 990 of FIG. 10), for example in the eyewear device 100 itself, mobile device (element 990 of FIG. 9), or another part of the photo filter (e.g., artistic) light field effect system (e.g., server system 998 of FIG. 9).

As explained below, photo filter (e.g., artistic) light field effect system takes a left image and a right image as input viewpoints, but no images with viewpoints in between. To generate a light field effect, where a character jumps and the camera rotates around the character at different angles as that moment in frozen in time, interpolation is performed between the left and right images captured by the left and right cameras 114A-B. Light field effect images from several different viewpoints can be stitched together as a sequence of images in a video to provide spatial movement.

Two non-original RGB (modified/unreal) left and right images are interpolated to generate the photo filter (e.g., artistic) light field effect image and the interpolation is based on the disparity maps generated from the two original RGB images. This provides an appearance of a 3D world sensation by rotating images that are not even real, but only requires two modified two-dimensional images (frames) to produce the light field effect. Disparity maps determine how many pixels to move between pixels in the left image to obtain a corresponding pixel in the right image, and vice versa. Disparity is calculated between a stereo pair of corresponding pixels, which corresponds to depth, in order to interpolate between two images that are non-original RGB images. In some examples, the left image can be blended black and white and the right image may be color. In another example, the artistic style is mimicked in one image, such as the left image, and the other image, such as the right image is the original RGB image and the interpolation is between one original RGB image and modified image based on the left and right disparity maps (as described in FIG. 13B later).

FIG. 1B is a top cross-sectional view of a right chunk 110B of the eyewear device 100 of FIG. 1A depicting the right visible light camera 114B of the depth-capturing camera, and a circuit board. FIG. 1C is a left side view of an example hardware configuration of an eyewear device 100 of FIG. 1A, which shows a left visible light camera 114A of the depth-capturing camera. FIG. 1D is a top cross-sectional view of a left chunk 110A of the eyewear device of FIG. 1C depicting the left visible light camera 114A of the depth-capturing camera, and a circuit board. Construction and placement of the left visible light camera 114A is substantially similar to the right visible light camera 114B, except the connections and coupling are on the left lateral side 170A. As shown in the example of FIG. 1B, the eyewear device 100 includes the right visible light camera 114B and a circuit board, which may be a flexible printed circuit board (PCB) 140B. The right hinge 226B connects the right chunk 110B to a right temple 125B of the eyewear device 100. In some examples, components of the right visible light camera 114B, the flexible PCB 140B, or other electrical connectors or contacts may be located on the right temple 125B or the right hinge 226B.

The right chunk 110B includes chunk body 211 and a chunk cap, with the chunk cap omitted in the cross-section of FIG. 1B. Disposed inside the right chunk 110B are various interconnected circuit boards, such as PCBs or flexible PCBs, that include controller circuits for right visible light camera 114B, microphone(s), low-power wireless circuitry (e.g., for wireless short range network communication via Bluetooth™), high-speed wireless circuitry (e.g., for wireless local area network communication via WiFi).

The right visible light camera 114B is coupled to or disposed on the flexible PCB 240 and covered by a visible light camera cover lens, which is aimed through opening(s) formed in the frame 105. For example, the right rim 107B of the frame 105 is connected to the right chunk 110B and includes the opening(s) for the visible light camera cover lens. The frame 105 includes a front-facing side configured to face outwards away from the eye of the user. The opening for the visible light camera cover lens is formed on and through the front-facing side. In the example, the right visible light camera 114B has an outward facing field of view 111B with a line of sight or perspective of the right eye of the user of the eyewear device 100. The visible light camera cover lens can also be adhered to an outward facing surface of the right chunk 110B in which an opening is formed with an outward facing angle of coverage, but in a different outwards direction. The coupling can also be indirect via intervening components.

Left (first) visible light camera 114A is connected to a left image display of left optical assembly 180A to capture a left eye viewed scene observed by a wearer of the eyewear device 100 in a left raw image. Right (second) visible light camera 114B is connected to a right image display of right optical assembly 180B to capture a right eye viewed scene observed by the wearer of the eyewear device 100 in a right raw image. The left raw image and the right raw image partially overlap to present a three-dimensional observable space of a generated depth image.

Flexible PCB 140B is disposed inside the right chunk 110B and is coupled to one or more other components housed in the right chunk 110B. Although shown as being formed on the circuit boards of the right chunk 110B, the right visible light camera 114B can be formed on the circuit boards of the left chunk 110A, the temples 125A-B, or frame 105.

Figure 2A:
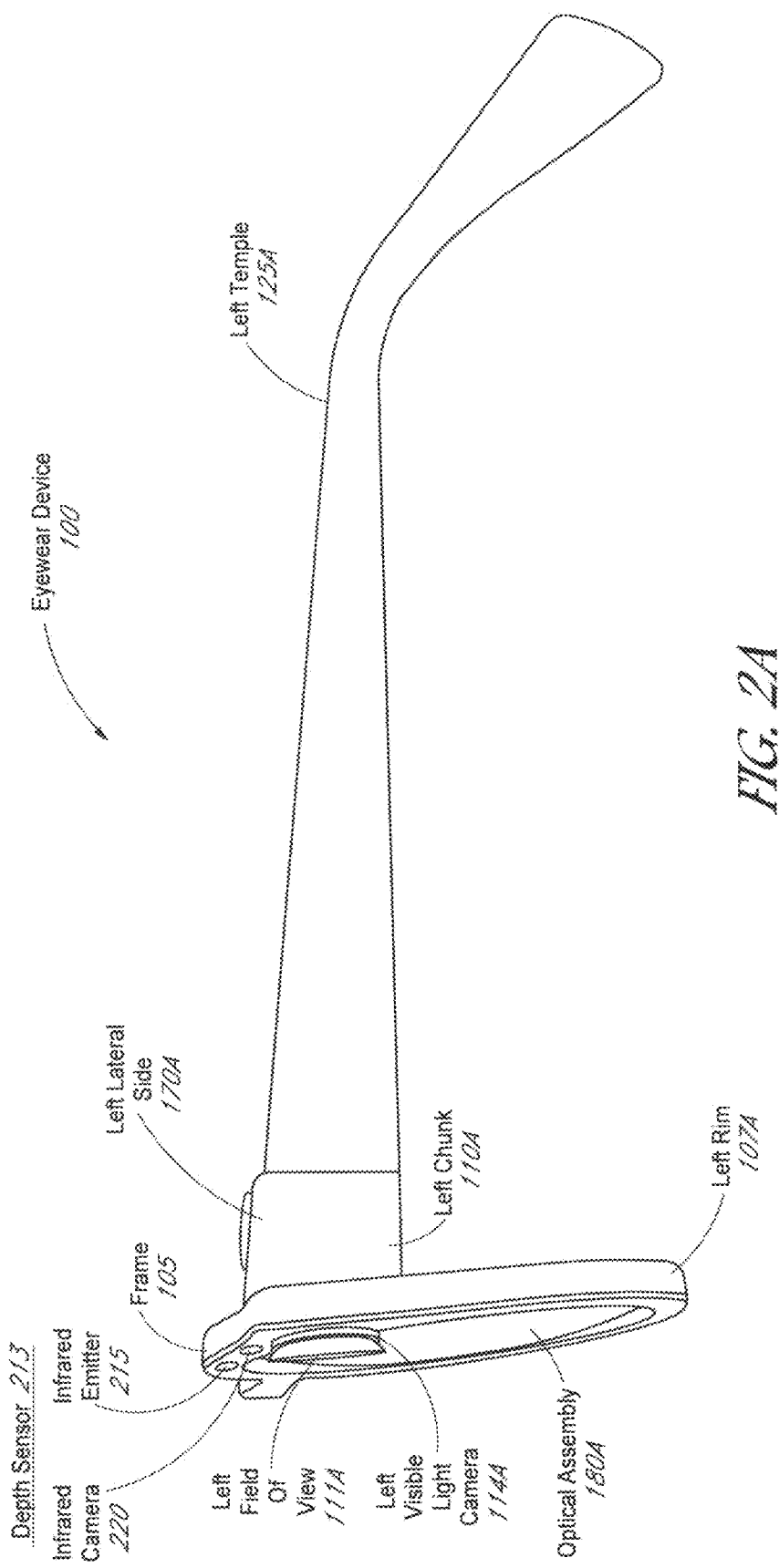
FIG. 2A is a right side view of another example hardware configuration of an eyewear device utilized in the photo filter (e.g., artistic) light field effect system, which shows the right visible light camera and a depth sensor of the depth-capturing camera to generate a depth image.

FIG. 2A is a right side view of another example hardware configuration of an eyewear device 100 utilized in the photo filter (e.g., artistic) light field effect system. As shown, the depth-capturing camera includes a left visible light camera 114A and a depth sensor 213 on a frame 105 to generate a depth image. Instead of utilizing at least two visible light cameras 114A-B to generate the depth image, here a single visible light camera 114A and the depth sensor 213 are utilized to generate depth images, such as the depth image. As in the example of FIGS. 1A-D, a photo filter selection input from a user is applied to an original image to create a photo filter image and then generate a photo filter light field effect image. The infrared camera 220 of the depth sensor 213 has an outward facing field of view that substantially overlaps with the left visible light camera 114A for a line of sight of the eye of the user. As shown, the infrared emitter 215 and the infrared camera 220 are co-located on the upper portion of the left rim 107A with the left visible light camera 114A.

In the example of FIG. 2A, the depth sensor 213 of the eyewear device 100 includes an infrared emitter 215 and an infrared camera 220 which captures an infrared image. Visible light cameras 114A-B typically include a blue light filter to block infrared light detection, in an example, the infrared camera 220 is a visible light camera, such as a low resolution video graphic array (VGA) camera (e.g., 640×480 pixels for a total of 0.3 megapixels), with the blue filter removed. The infrared emitter 215 and the infrared camera 220 are co-located on the frame 105, for example, both are shown as connected to the upper portion of the left rim 107A. As described in further detail below, the frame 105 or one or more of the left and right chunks 110A-B include a circuit board that includes the infrared emitter 215 and the infrared camera 220. The infrared emitter 215 and the infrared camera 220 can be connected to the circuit board by soldering, for example.

Other arrangements of the infrared emitter 215 and infrared camera 220 can be implemented, including arrangements in which the infrared emitter 215 and infrared camera 220 are both on the right rim 107A, or in different locations on the frame 105, for example, the infrared emitter 215 is on the left rim 107B and the infrared camera 220 is on the right rim 107B. However, the at least one visible light camera 114A and the depth sensor 213 typically have substantially overlapping fields of view to generate three-dimensional depth images. In another example, the infrared emitter 215 is on the frame 105 and the infrared camera 220 is on one of the chunks 110A-B, or vice versa. The infrared emitter 215 can be connected essentially anywhere on the frame 105, left chunk 110A, or right chunk 110B to emit a pattern of infrared in the light of sight of the eye of the user. Similarly, the infrared camera 220 can be connected essentially anywhere on the frame 105, left chunk 110A, or right chunk 110B to capture at least one reflection variation in the emitted pattern of infrared light of a three-dimensional scene in the light of sight of the eye of the user.

The infrared emitter 215 and infrared camera 220 are arranged to face outwards to pick up an infrared image of a scene with objects or object features that the user wearing the eyewear device 100 observes. For example, the infrared emitter 215 and infrared camera 220 are positioned directly in front of the eye, in the upper part of the frame 105 or in the chunks 110A-B at either ends of the frame 105 with a forward facing field of view to capture images of the scene which the user is gazing at, for measurement of depth of objects and object features.

In one example, the infrared emitter 215 of the depth sensor 213 emits infrared light illumination in the forward facing field of view of the scene, which can be near-infrared light or other short-wavelength beam of low-energy radiation. Alternatively, or additionally, the depth sensor 213 may include an emitter that emits other wavelengths of light besides infrared and the depth sensor 213 further includes a camera sensitive to that wavelength that receives and captures images with that wavelength. As noted above, the eyewear device 100 is coupled to a processor and a memory, for example in the eyewear device 100 itself or another part of the photo filter (e.g., artistic) light field effect system. Eyewear device 100 or the photo filter (e.g., artistic) light field effect system can subsequently process the captured infrared image during generation of three-dimensional depth images, such as the depth image.

Figure 2B:
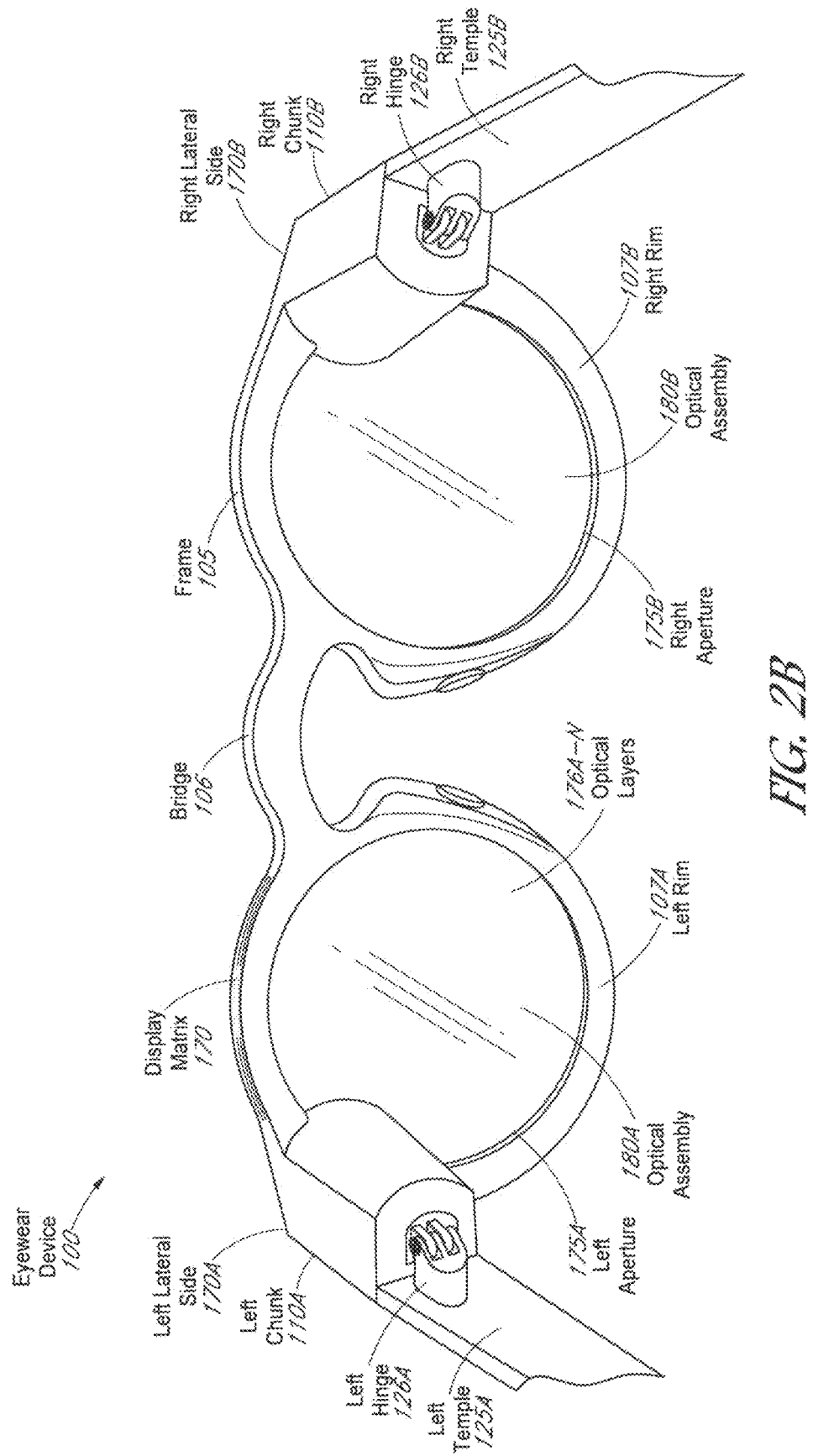
FIGS. 2B and 2C are rear views of example hardware configurations of the eyewear device, including two different types of image displays.
Figure 2C:
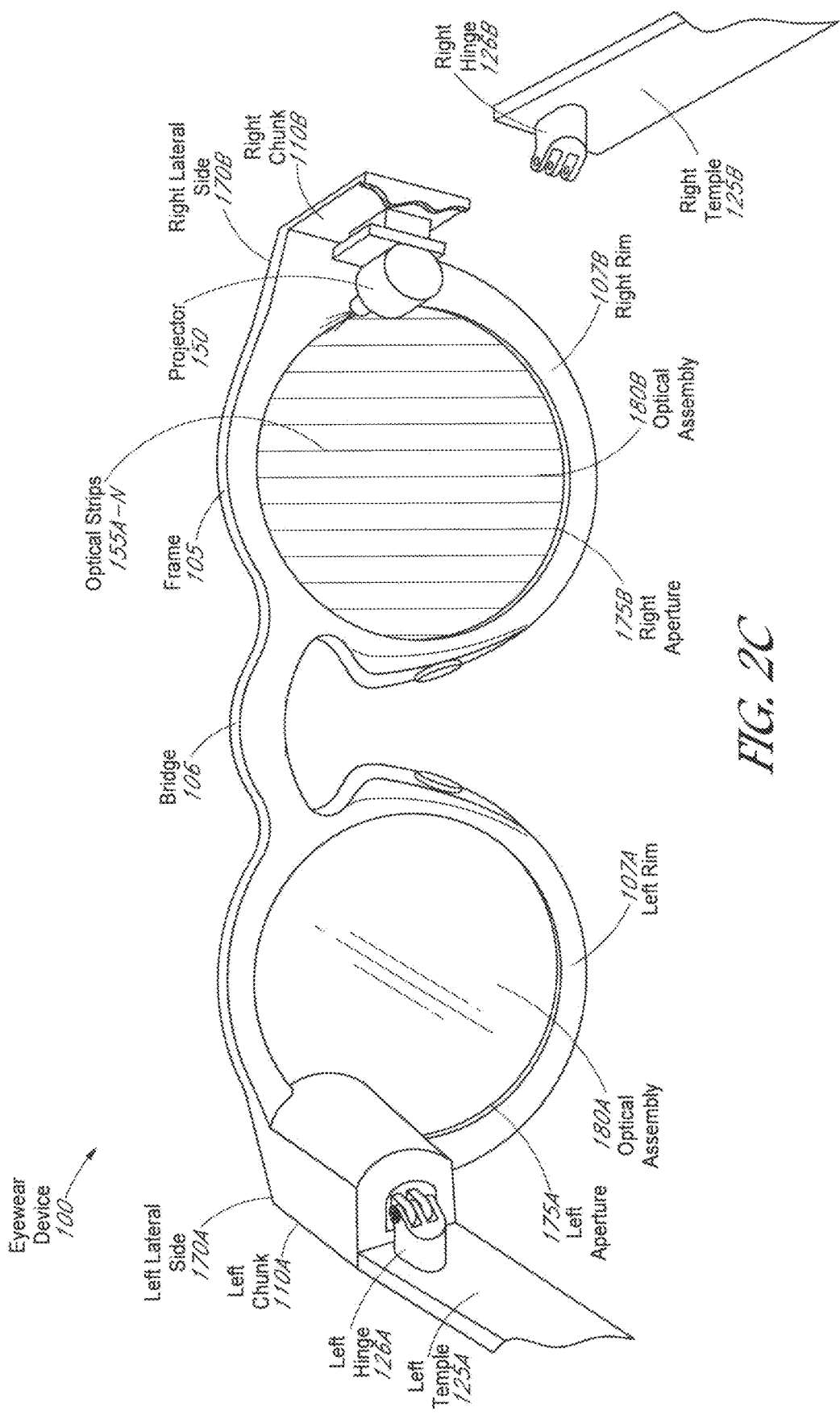

FIGS. 2B-C are rear views of example hardware configurations of the eyewear device 100, including two different types of image displays. Eyewear device 100 is in a form configured for wearing by a user, which are eyeglasses in the example. The eyewear device 100 can take other forms and may incorporate other types of frameworks, for example, a headgear, a headset, or a helmet.

In the eyeglasses example, eyewear device 100 includes a frame 105 including a left rim 107A connected to a right rim 107B via a bridge 106 adapted for a nose of the user. The left and right rims 107A-B include respective apertures 175A-B, which hold a respective optical element 180A-B, such as a lens and a display device. As used herein, the term "lens" is meant to cover transparent or translucent pieces of glass or plastic having curved and/or flat surfaces that cause light to converge/diverge or that cause little or no convergence or divergence.

Although shown as having two optical elements 180A-B, the eyewear device 100 can include other arrangements, such as a single optical element or may not include any optical element 180A-B depending on the application or intended user of the eyewear device 100. As further shown, eyewear device 100 includes a left chunk 110A adjacent the left lateral side 170A of the frame 105 and a right chunk 110B adjacent the right lateral side 170B of the frame 105. The chunks 110A-B may be integrated into the frame 105 on the respective sides 170A-B (as illustrated) or implemented as separate components attached to the frame 105 on the respective sides 170A-B. Alternatively, the chunks 110A-B may be integrated into temples (not shown) attached to the frame 105.

In one example, the image display of optical assembly 180A-B includes an integrated image display. As shown in FIG. 2B, the optical assembly 180A-B includes a suitable display matrix 170 of any suitable type, such as a liquid crystal display (LCD), an organic light-emitting diode (OLED) display, or any other such display. The optical assembly 180A-B also includes an optical layer or layers 176, which can include lenses, optical coatings, prisms, mirrors, waveguides, optical strips, and other optical components in any combination. The optical layers 176A-N can include a prism having a suitable size and configuration and including a first surface for receiving light from display matrix and a second surface for emitting light to the eye of the user. The prism of the optical layers 176A-N extends over all or at least a portion of the respective apertures 175A-B formed in the left and right rims 107A-B to permit the user to see the second surface of the prism when the eye of the user is viewing through the corresponding left and right rims 107A-B. The first surface of the prism of the optical layers 176A-N faces upwardly from the frame 105 and the display matrix overlies the prism so that photons and light emitted by the display matrix impinge the first surface. The prism is sized and shaped so that the light is refracted within the prism and is directed towards the eye of the user by the second surface of the prism of the optical layers 176A-N. In this regard, the second surface of the prism of the optical layers 176A-N can be convex to direct the light towards the center of the eye. The prism can optionally be sized and shaped to magnify the image projected by the display matrix 170, and the light travels through the prism so that the image viewed from the second surface is larger in one or more dimensions than the image emitted from the display matrix 170.

In another example, the image display device of optical assembly 180A-B includes a projection image display as shown in FIG. 2C. The optical assembly 180A-B includes a laser projector 150, which is a three-color laser projector using a scanning mirror or galvanometer. During operation, an optical source such as a laser projector 150 is disposed in or on one of the temples 125A-B of the eyewear device 100. Optical assembly 180A-B includes one or more optical strips 155A-N spaced apart across the width of the lens of the optical assembly 180A-B or across a depth of the lens between the front surface and the rear surface of the lens.

As the photons projected by the laser projector 150 travel across the lens of the optical assembly 180A-B, the photons encounter the optical strips 155A-N. When a particular photon encounters a particular optical strip, the photon is either redirected towards the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A-B, the eyewear device 100 can include other arrangements, such as a single or three optical assemblies, or the optical assembly 180A-B may have arranged different arrangement depending on the application or intended user of the eyewear device 100.

As further shown in FIGS. 2B-C, eyewear device 100 includes a left chunk 110A adjacent the left lateral side 170A of the frame 105 and a right chunk 110B adjacent the right lateral side 170B of the frame 105. The chunks 110A-B may be integrated into the frame 105 on the respective lateral sides 170A-B (as illustrated) or implemented as separate components attached to the frame 105 on the respective sides 170A-B. Alternatively, the chunks 110A-B may be integrated into temples 125A-B attached to the frame 105. As used herein, the chunks 110A-B can include an enclosure that encloses a collection of processing units, camera, sensors, etc. (e.g., different for the right and left side) that are encompassed in an enclosure.

In one example, the image display includes a first (left) image display and a second (right) image display. Eyewear device 100 includes first and second apertures 175A-B, which hold a respective first and second optical assembly 180A-B. The first optical assembly 180A includes the first image display (e.g., a display matrix 170A of FIG. 2B; or optical strips 155A-N' and a projector 150A of FIG. 2C). The second optical assembly 180B includes the second image display e.g., a display matrix 170B of FIG. 2B; or optical strips 155A-N" and a projector 150B of FIG. 2C).

Figure 3:
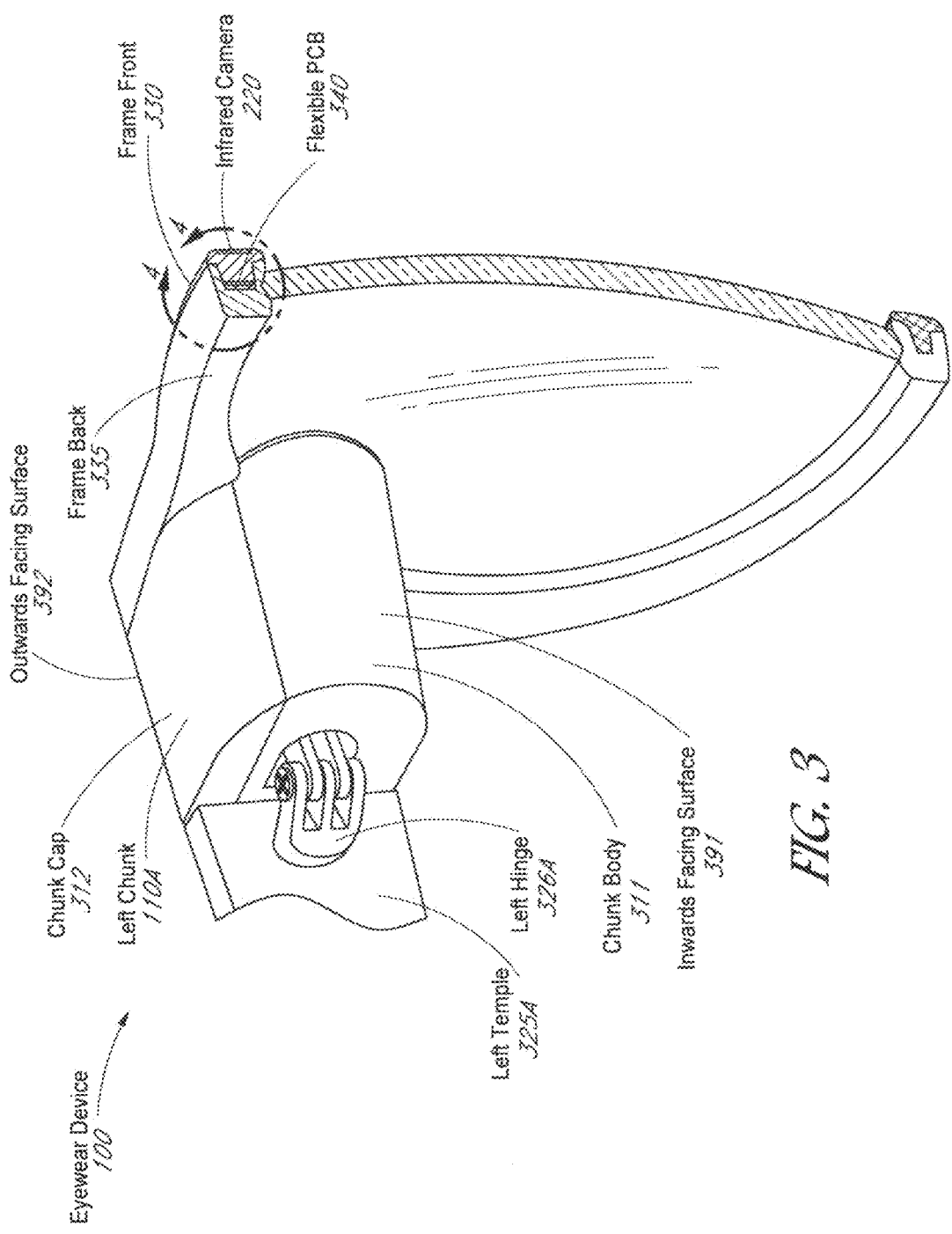
FIG. 3 shows a rear perspective sectional view of the eyewear device of FIG. 2A depicting an infrared camera of the depth sensor, a frame front, a frame back, and a circuit board.

FIG. 3 shows a rear perspective sectional view of the eyewear device of FIG. 2A depicting an infrared camera 220, a frame front 330, a frame back 335, and a circuit board. It can be seen that the upper portion of the left rim 107A of the frame 105 of the eyewear device 100 includes a frame front 330 and a frame back 335. The frame front 330 includes a front-facing side configured to face outwards away from the eye of the user. The frame back 335 includes a rear-facing side configured to face inwards towards the eye of the user. An opening for the infrared camera 220 is formed on the frame front 330.

As shown in the encircled cross-section 4-4 of the upper middle portion of the left rim 107A of the frame 105, a circuit board, which is a flexible printed circuit board (PCB) 340, is sandwiched between the frame front 330 and the frame back 335. Also shown in further detail is the attachment of the left chunk 110A to the left temple 325A via a left hinge 326A. In some examples, components of the depth sensor 213, including the infrared camera 220, the flexible PCB 340, or other electrical connectors or contacts may be located on the left temple 325A or the left hinge 326A.

In an example, the left chunk 110A includes a chunk body 311, a chunk cap 312, an inwards facing surface 391 and an outwards facing surface 392 (labeled, but not visible). Disposed inside the left chunk 110A are various interconnected circuit boards, such as PCBs or flexible PCBs, which include controller circuits for charging a battery, inwards facing light emitting diodes (LEDs), and outwards (forward) facing LEDs. Although shown as being formed on the circuit boards of the left rim 107A, the depth sensor 213, including the infrared emitter 215 and the infrared camera 220, can be formed on the circuit boards of the right rim 107B to captured infrared images utilized in the generation of three-dimensional depth images, for example, in combination with right visible light camera 114B.

Figure 4:
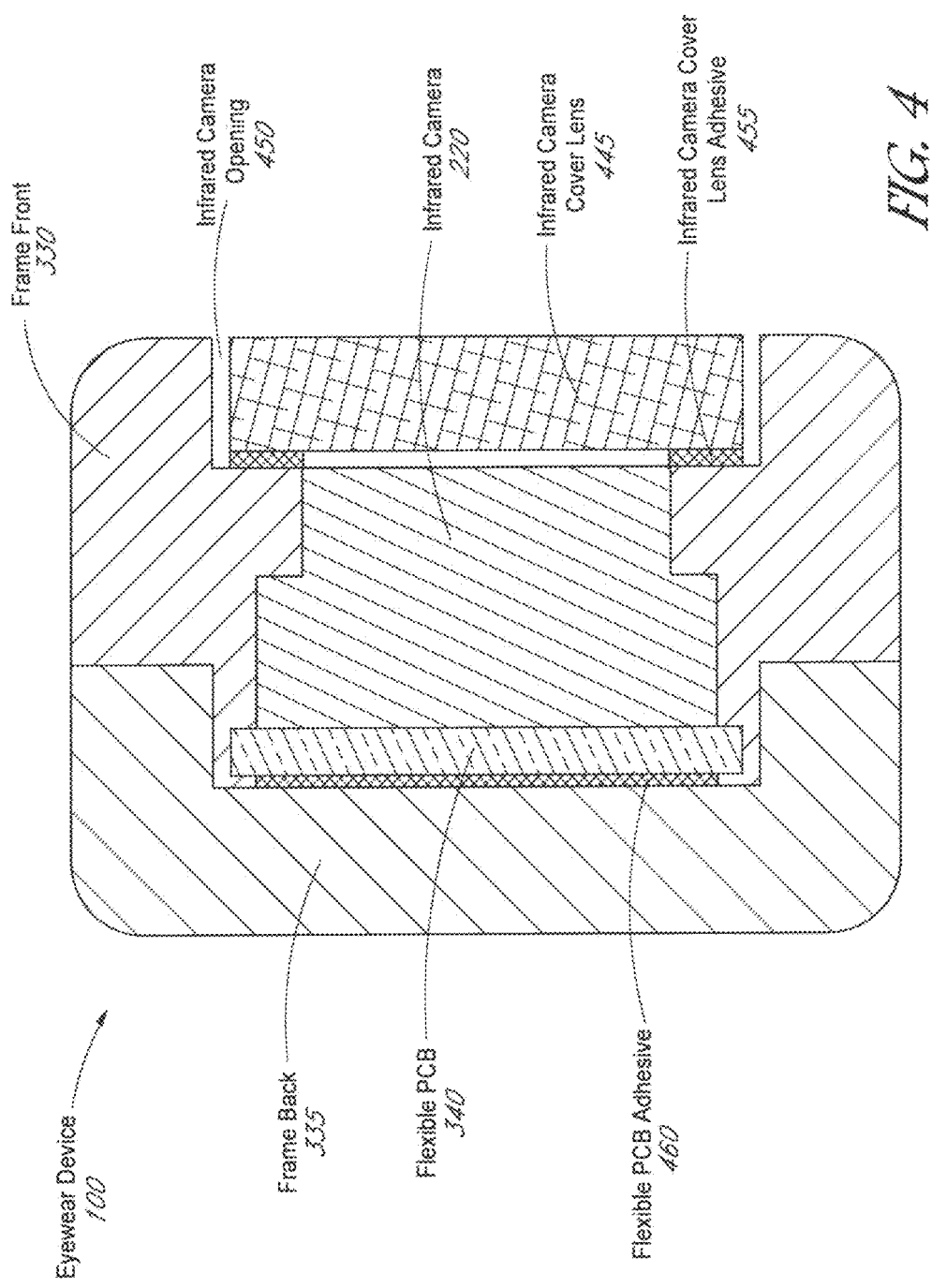
FIG. 4 is a cross-sectional view taken through the infrared camera and the frame of the eyewear device of FIG. 3.

FIG. 4 is a cross-sectional view through the infrared camera 220 and the frame corresponding to the encircled cross-section 4-4 of the eyewear device of FIG. 3. Various layers of the eyewear device 100 are visible in the cross-section of FIG. 4. As shown, the flexible PCB 340 is disposed on the frame back 335 and connected to the frame front 330. The infrared camera 220 is disposed on the flexible PCB 340 and covered by an infrared camera cover lens 445. For example, the infrared camera 220 is reflowed to the back of the flexible PCB 340. Reflowing attaches the infrared camera 220 to electrical contact pad(s) formed on the back of the flexible PCB 340 by subjecting the flexible PCB 340 to controlled heat, which melts a solder paste to connect the two components. In one example, reflowing is used to surface mount the infrared camera 220 on the flexible PCB 340 and electrically connect the two components. However, it should be understood that through-holes can be used to connect leads from the infrared camera 220 to the flexible PCB 340 via interconnects, for example.

The frame front 330 includes an infrared camera opening 450 for the infrared camera cover lens 445. The infrared camera opening 450 is formed on a front-facing side of the frame front 330 that is configured to face outwards away from the eye of the user and towards a scene being observed by the user. In the example, the flexible PCB 340 can be connected to the frame back 335 via a flexible PCB adhesive 460. The infrared camera cover lens 445 can be connected to the frame front 330 via infrared camera cover lens adhesive 455. The connection can be indirect via intervening components.

Figure 5:
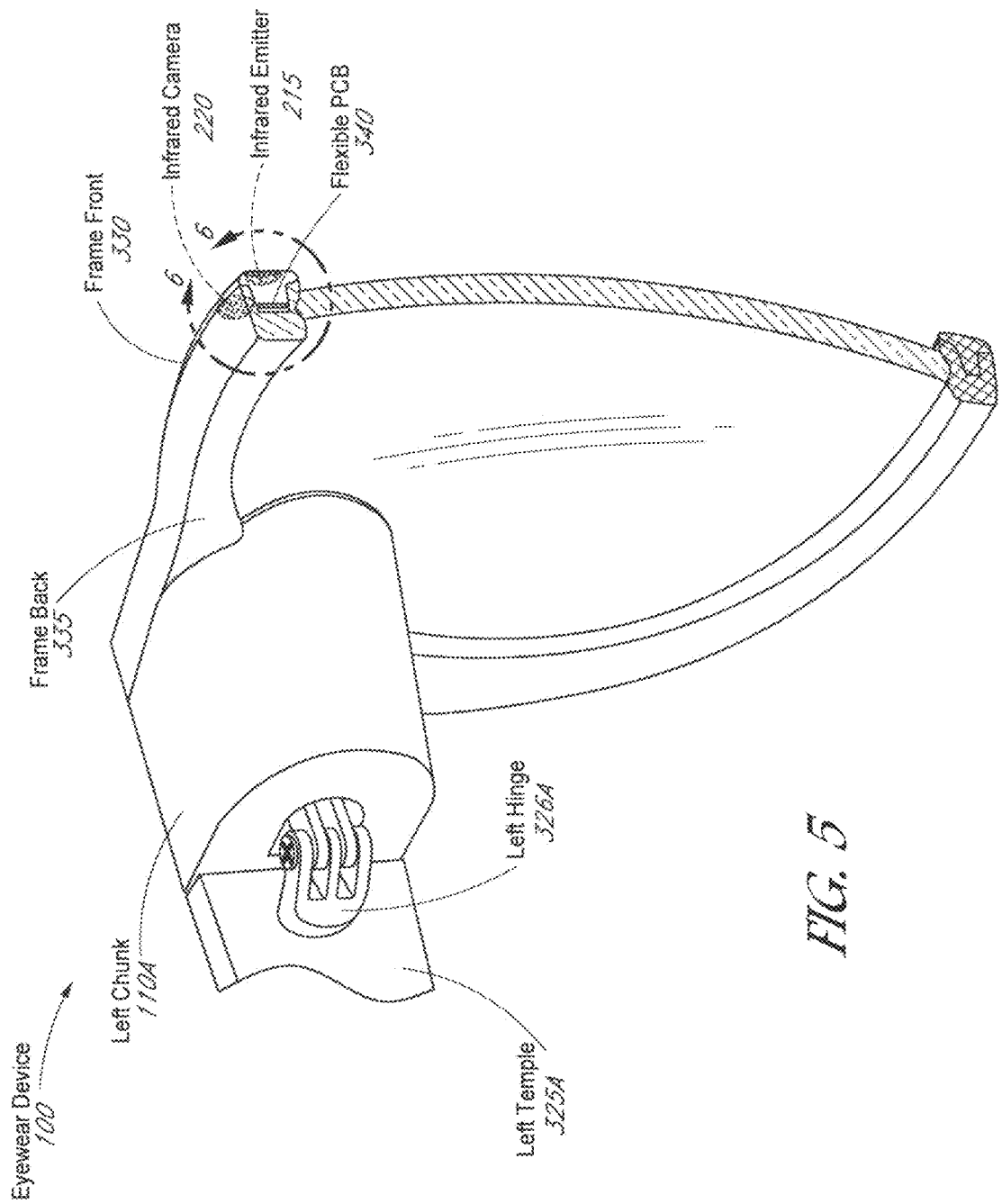
FIG. 5 shows a rear perspective view of the eyewear device of FIG. 2A depicting an infrared emitter of the depth sensor, the infrared camera of the depth sensor, the frame front, the frame back, and the circuit board.

FIG. 5 shows a rear perspective view of the eyewear device of FIG. 2A. The eyewear device 100 includes an infrared emitter 215, infrared camera 220, a frame front 330, a frame back 335, and a circuit board 340. As in FIG. 3, it can be seen in FIG. 5 that the upper portion of the left rim of the frame of the eyewear device 100 includes the frame front 330 and the frame back 335. An opening for the infrared emitter 215 is formed on the frame front 330.

As shown in the encircled cross-section 6-6 in the upper middle portion of the left rim of the frame, a circuit board, which is a flexible PCB 340, is sandwiched between the frame front 330 and the frame back 335. Also shown in further detail is the attachment of the left chunk 110A to the left temple 325A via the left hinge 326A. In some examples, components of the depth sensor 213, including the infrared emitter 215, the flexible PCB 340, or other electrical connectors or contacts may be located on the left temple 325A or the left hinge 326A.

Figure 6:
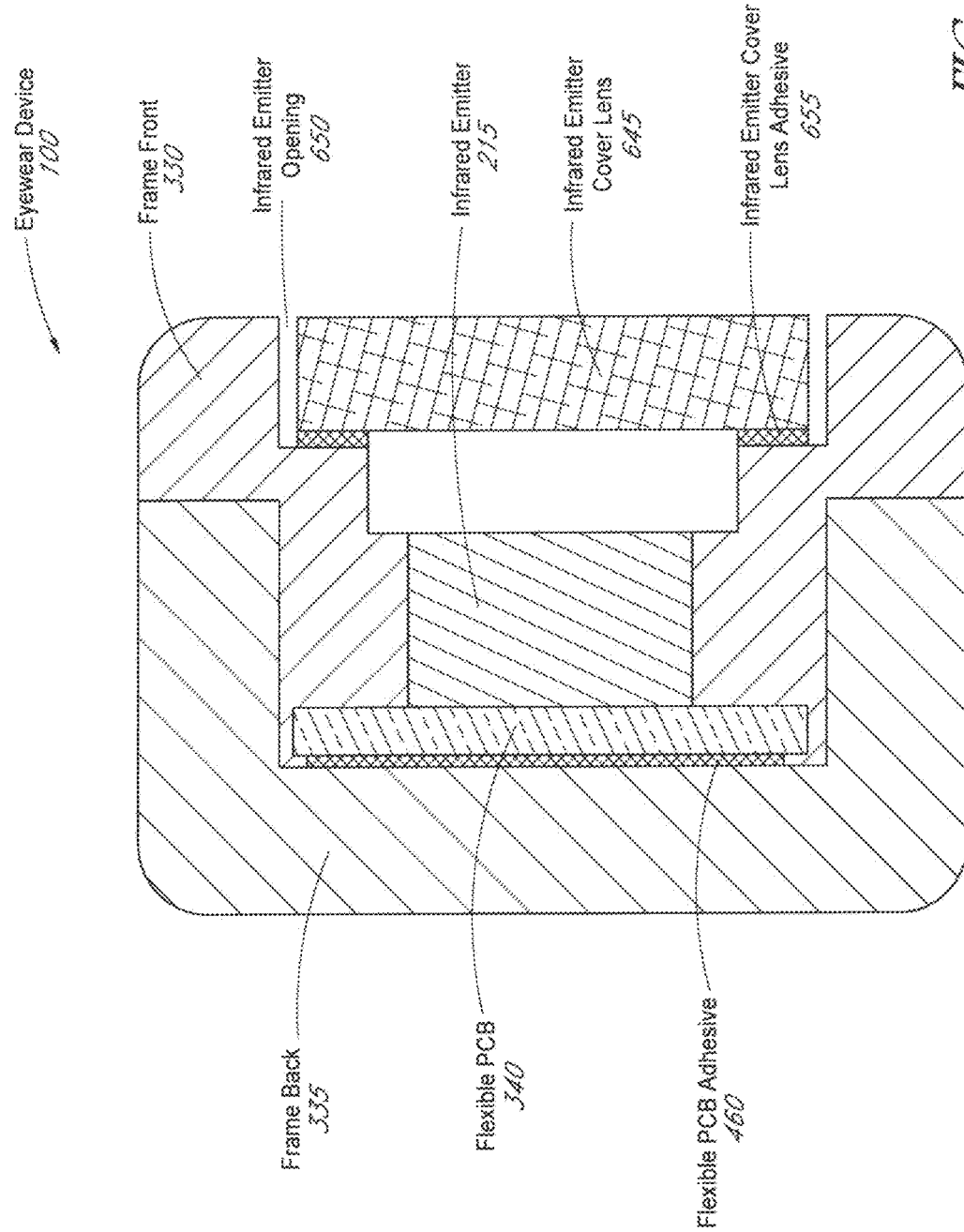
FIG. 6 is a cross-sectional view taken through the infrared emitter and the frame of the eyewear device of FIG. 5.

FIG. 6 is a cross-sectional view through the infrared emitter 215 and the frame corresponding to the encircled cross-section 6-6 of the eyewear device of FIG. 5. Multiple layers of the eyewear device 100 are illustrated in the cross-section of FIG. 6, as shown the frame 105 includes the frame front 330 and the frame back 335. The flexible PCB 340 is disposed on the frame back 335 and connected to the frame front 330. The infrared emitter 215 is disposed on the flexible PCB 340 and covered by an infrared emitter cover lens 645. For example, the infrared emitter 215 is reflowed to the back of the flexible PCB 340. Reflowing attaches the infrared emitter 215 to contact pad(s) formed on the back of the flexible PCB 340 by subjecting the flexible PCB 340 to controlled heat, which melts a solder paste to connect the two components. In one example, reflowing is used to surface mount the infrared emitter 215 on the flexible PCB 340 and electrically connect the two components. However, it should be understood that through-holes can be used to connect leads from the infrared emitter 215 to the flexible PCB 340 via interconnects, for example.

The frame front 330 includes an infrared emitter opening 650 for the infrared emitter cover lens 645. The infrared emitter opening 650 is formed on a front-facing side of the frame front 330 that is configured to face outwards away from the eye of the user and towards a scene being observed by the user. In the example, the flexible PCB 340 can be connected to the frame back 335 via the flexible PCB adhesive 460. The infrared emitter cover lens 645 can be connected to the frame front 330 via infrared emitter cover lens adhesive 655. The coupling can also be indirect via intervening components.

Figure 7:
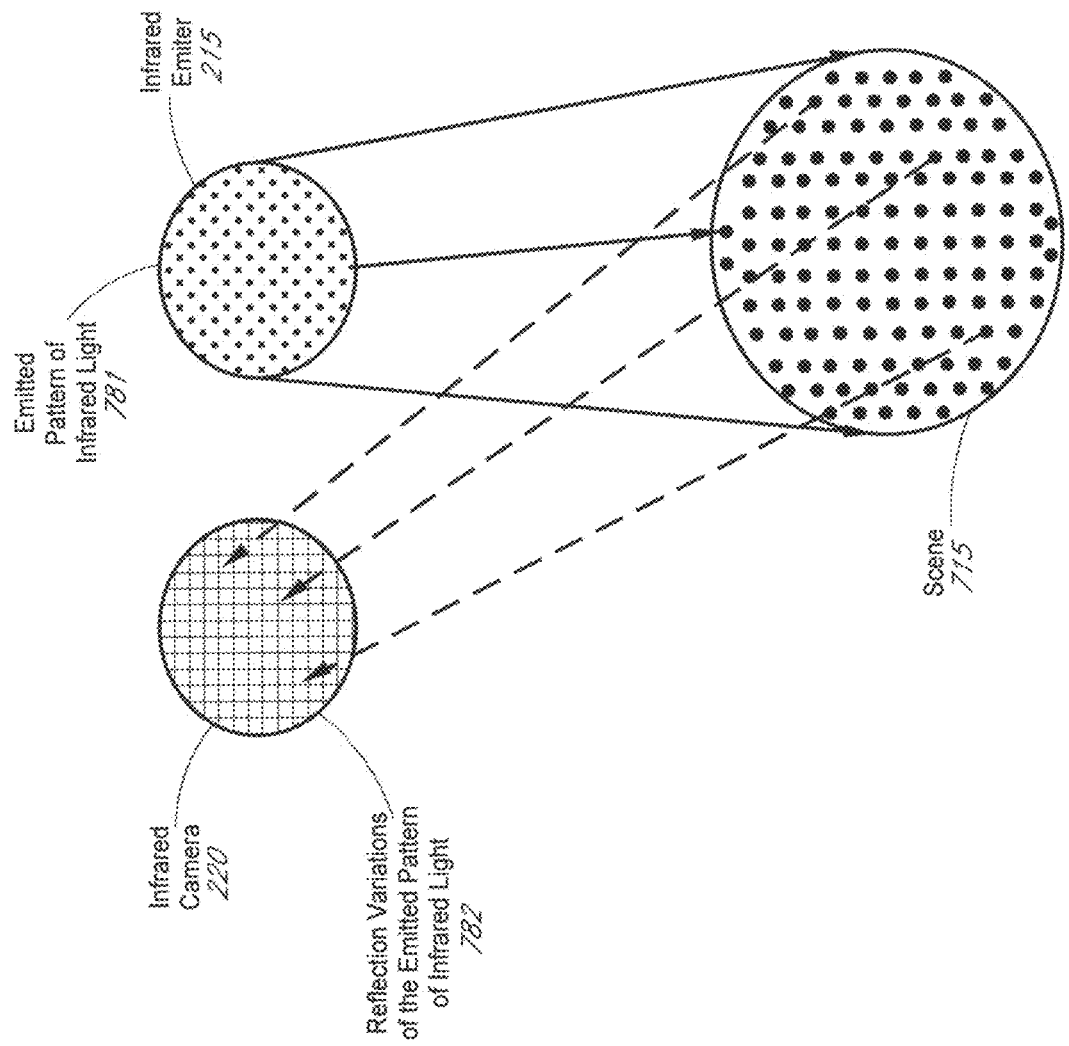
FIG. 7 depicts an example of a pattern of infrared light emitted by the infrared emitter of the depth sensor and reflection variations of the emitted pattern of infrared light captured by the infrared camera of the depth sensor of the eyewear device to measure depth of pixels in a raw image to generate the depth image.

FIG. 7 depicts an example of an emitted pattern of infrared light 781 emitted by an infrared emitter 215 of the depth sensor 213. As shown, reflection variations of the emitted pattern of infrared light 782 are captured by the infrared camera 220 of the depth sensor 213 of the eyewear device 100 as an infrared image. The reflection variations of the emitted pattern of infrared light 782 is utilized to measure depth of pixels in a raw image (e.g., left raw image) to generate a three-dimensional depth image, such as the depth image.

Depth sensor 213 in the example includes the infrared emitter 215 to project a pattern of infrared light and the infrared camera 220 to capture infrared images of distortions of the projected infrared light by objects or object features in a space, shown as scene 715 being observed by the wearer of the eyewear device 100. The infrared emitter 215, for example, may blast infrared light 781, which falls on objects, or object features within the scene 715 like a sea of dots. In some examples, the infrared light is emitted as a line pattern, a spiral, or a pattern of concentric rings or the like. Infrared light is typically not visible to the human eye. The infrared camera 220 is similar to a standard red, green, and blue (RGB) camera but receives and captures images of light in the infrared wavelength range. For depth sensing, the infrared camera 220 is coupled to an image processor (element 912 of FIG. 9) and the photo filter (e.g., artistic) light field effect programming (element 945) that judge time of flight based on the captured infrared image of the infrared light. For example, the distorted dot pattern 782 in the captured infrared image can then be processed by an image processor to determine depth from the displacement of dots. Typically, nearby objects or object features have a pattern with dots spread further apart and far away objects have a denser dot pattern. It should be understood that the foregoing functionality can be embodied in programming instructions of photo filter (e.g., artistic) light field effect programming or application (element 945) found in one or more components of the system.

Figure 8A:
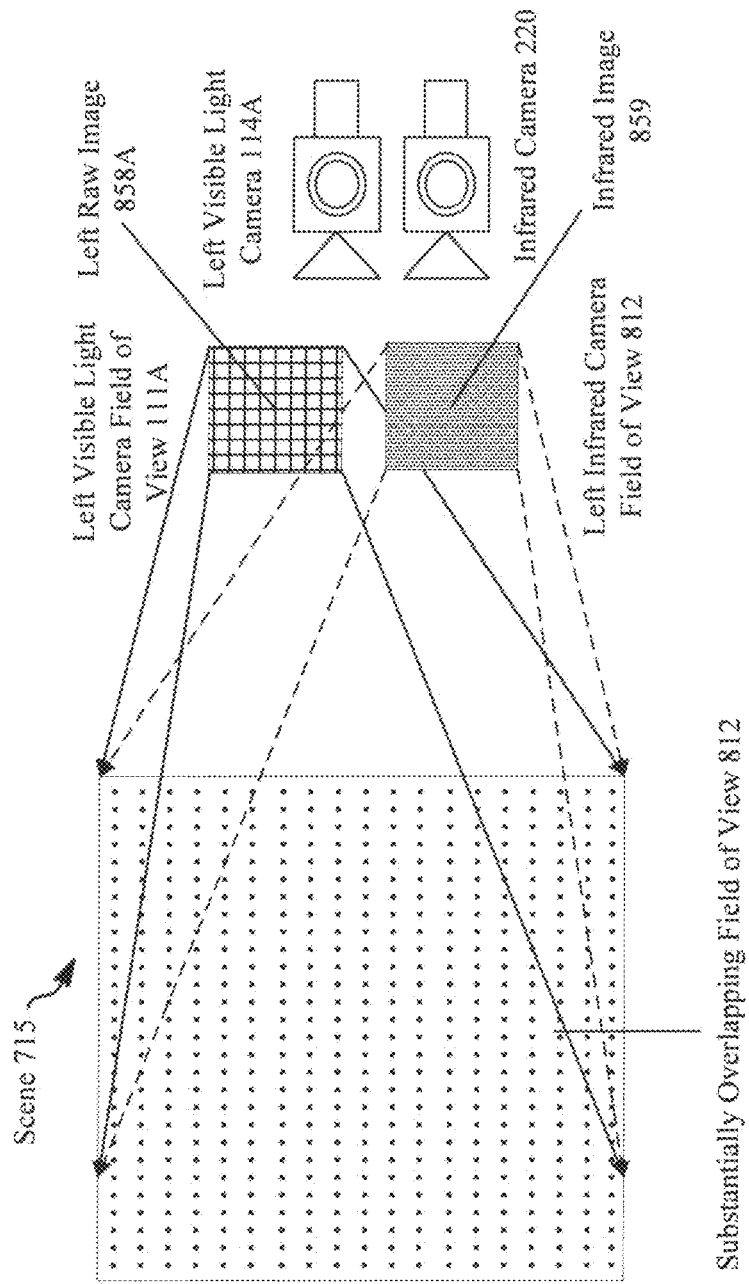
FIG. 8A depicts an example of infrared light captured by the infrared camera of the depth sensor as an infrared image and visible light captured by a visible light camera as a raw image to generate the depth image of a three-dimensional scene.

FIG. 8A depicts an example of infrared light captured by the infrared camera 220 of the depth sensor 213 with a left infrared camera field of view 812. Infrared camera 220 captures reflection variations in the emitted pattern of infrared light 782 in the three-dimensional scene 715 as an infrared image 859. As further shown, visible light is captured by the left visible light camera 114A with a left visible light camera field of view 111A as a left raw image 858A. Based on the infrared image 859 and left raw image 858A, the three-dimensional depth image of the three-dimensional scene 715 is generated.

Figure 8B:
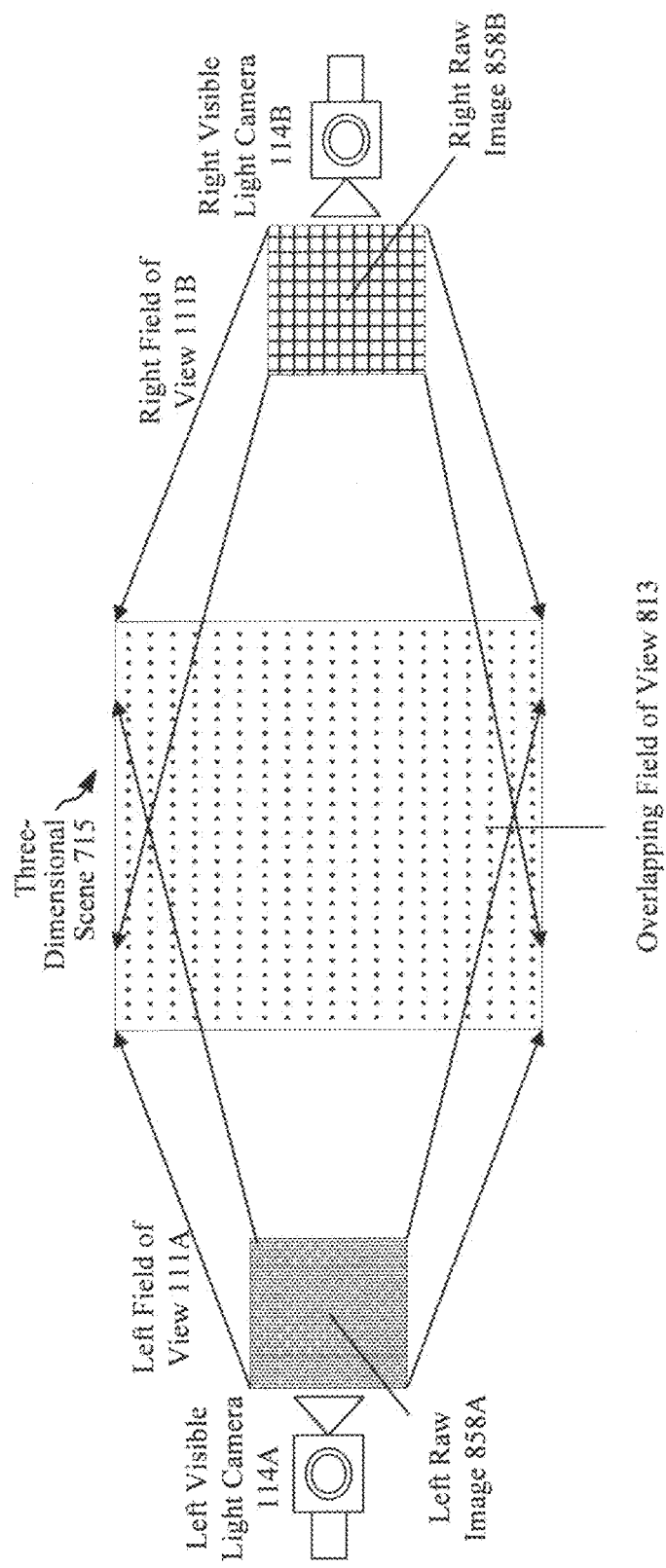
FIG. 8B depicts an example of visible light captured by the left visible light camera as left raw image and visible light captured by the right visible light camera as a right raw image to generate the depth image of a three-dimensional scene.

FIG. 8B depicts an example of visible light captured by the left visible light camera 114A and visible light captured with a right visible light camera 114B. Visible light is captured by the left visible light camera 114A with a left visible light camera field of view 111A as a left raw image 858A. Visible light is captured by the right visible light camera 114B with a right visible light camera field of view 111B as a right raw image 858B. Based on the left raw image 858A and the right raw image 858B, the three-dimensional depth image of the three-dimensional scene 715 is generated.

Figure 9:
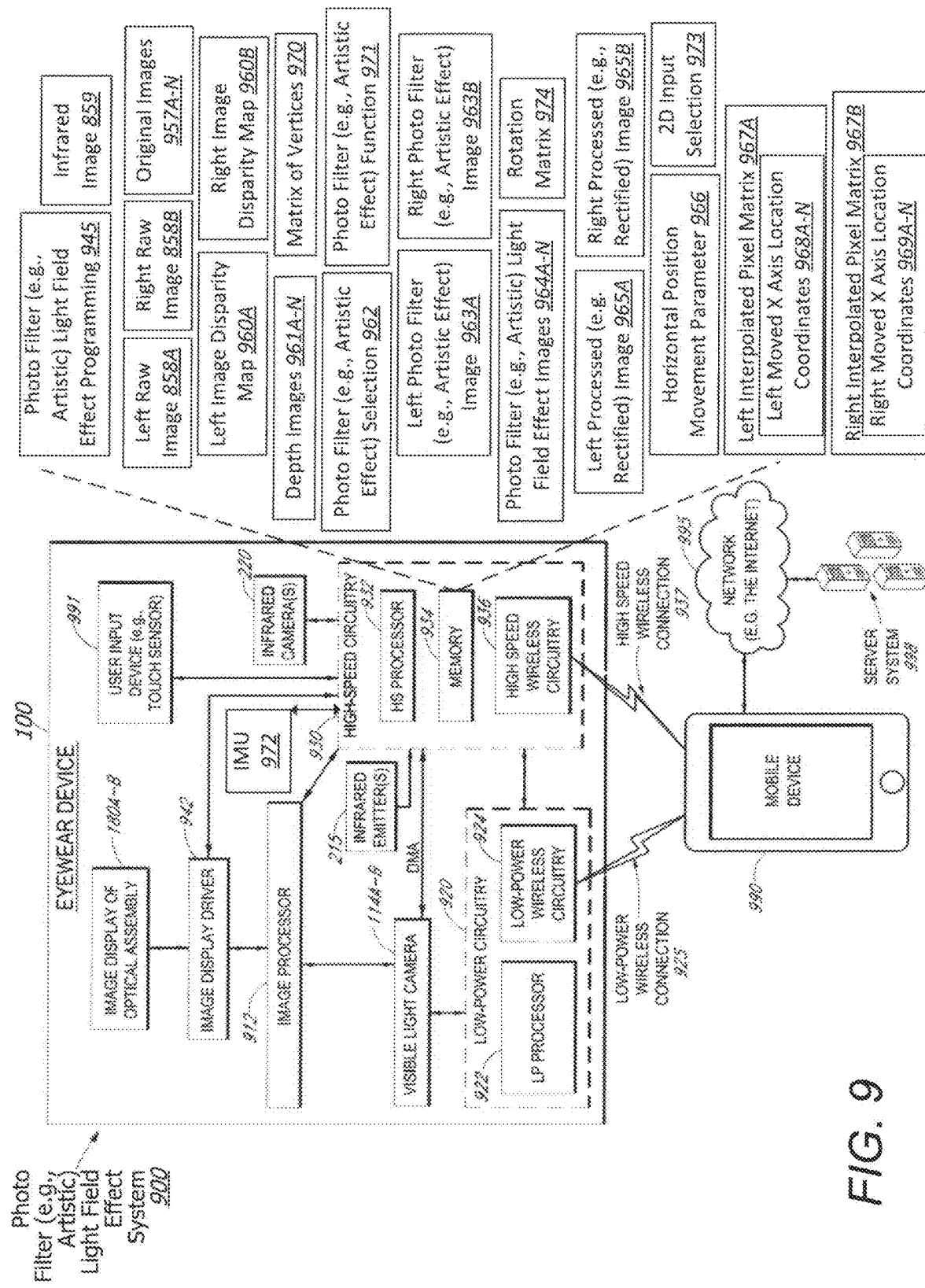
FIG. 9 is a high-level functional block diagram of an example photo filter (e.g., artistic) light field effect system including the eyewear device with a depth-capturing camera to generate a photo filter light field effect image and a user input device (e.g., touch sensor), a mobile device, and a server system connected via various networks.

FIG. 9 is a high-level functional block diagram of an example photo filter (e.g., artistic) light field effect system 900, which includes a wearable device (e.g., the eyewear device 100), a mobile device 990, and a server system 998 connected via various networks. Eyewear device 100 includes a depth-capturing camera, such as at least one of the visible light cameras 114A-B; and the depth sensor 213, shown as infrared emitter 215 and infrared camera 220. The depth-capturing camera can alternatively include at least two visible light cameras 114A-B (one associated with the left lateral side 170A and one associated with the right lateral side 170B). Depth-capturing camera generates depth images 961A-N, which are rendered three-dimensional (3D) models that are texture mapped images of a red, green, and blue (RGB) imaged scene, e.g., derived from the raw images 858A-N and processed (e.g., rectified) images 965A-N.

Mobile device 990 may be a smartphone, tablet, laptop computer, access point, or any other such device capable of connecting with eyewear device 100 using both a low-power wireless connection 925 and a high-speed wireless connection 937. Mobile device 990 is connected to server system 998 and network 995. The network 995 may include any combination of wired and wireless connections.

Eyewear device 100 further includes two image displays of the optical assembly 180A-B (one associated with the left lateral side 170A and one associated with the right lateral side 170B). Eyewear device 100 also includes image display driver 942, image processor 912, low-power circuitry 920, and high-speed circuitry 930. Image display of optical assembly 180A-B are for presenting images, such as original images 957A-N (e.g., raw images 858A-N and processed images 965A-N), photo filter (e.g., artistic effect) images 963A-N, and photo filter (e.g., artistic) light field effect images 964A-N. Image display driver 942 is coupled to the image display of optical assembly 180A-B to control the image display of optical assembly 180A-B to present the images. Eyewear device 100 further includes a user input device 991 (e.g., touch sensor) to receive a photo filter (e.g., artistic effect) selection 962 input and may receive a two-dimensional (2D) input selection 973 from a user.

The components shown in FIG. 9 for the eyewear device 100 are located on one or more circuit boards, for example a PCB or flexible PCB, in the rims or temples. Alternatively, or additionally, the depicted components can be located in the chunks, frames, hinges, or bridge of the eyewear device 100. Left and right visible light cameras 114A-B can include digital camera elements such as a complementary metal-oxide-semiconductor (CMOS) image sensor, charge coupled device, a lens, or any other respective visible or light capturing elements that may be used to capture data, including images of scenes with unknown objects.

Eyewear device includes 100 includes a memory 934 which includes photo filter (e.g., artistic) light field effect programming 945 to perform a subset or all of the functions described herein for photo filter (e.g., artistic) light field effects, in which a photo filter selection 962 from a user is applied to raw images 858A-B or processed images 965A-B to generate photo filter (e.g., artistic) light field effect images 964A-N. As shown, memory 934 further includes a left raw image 858A captured by left visible light camera 114A, a right raw image 858B captured by right visible light camera 114B, and an infrared image 859 captured by infrared camera 220 of the depth sensor 213. Memory 934 further includes multiple depth images 961A-N, which are generated, via the depth-capturing camera.

Figure 11:
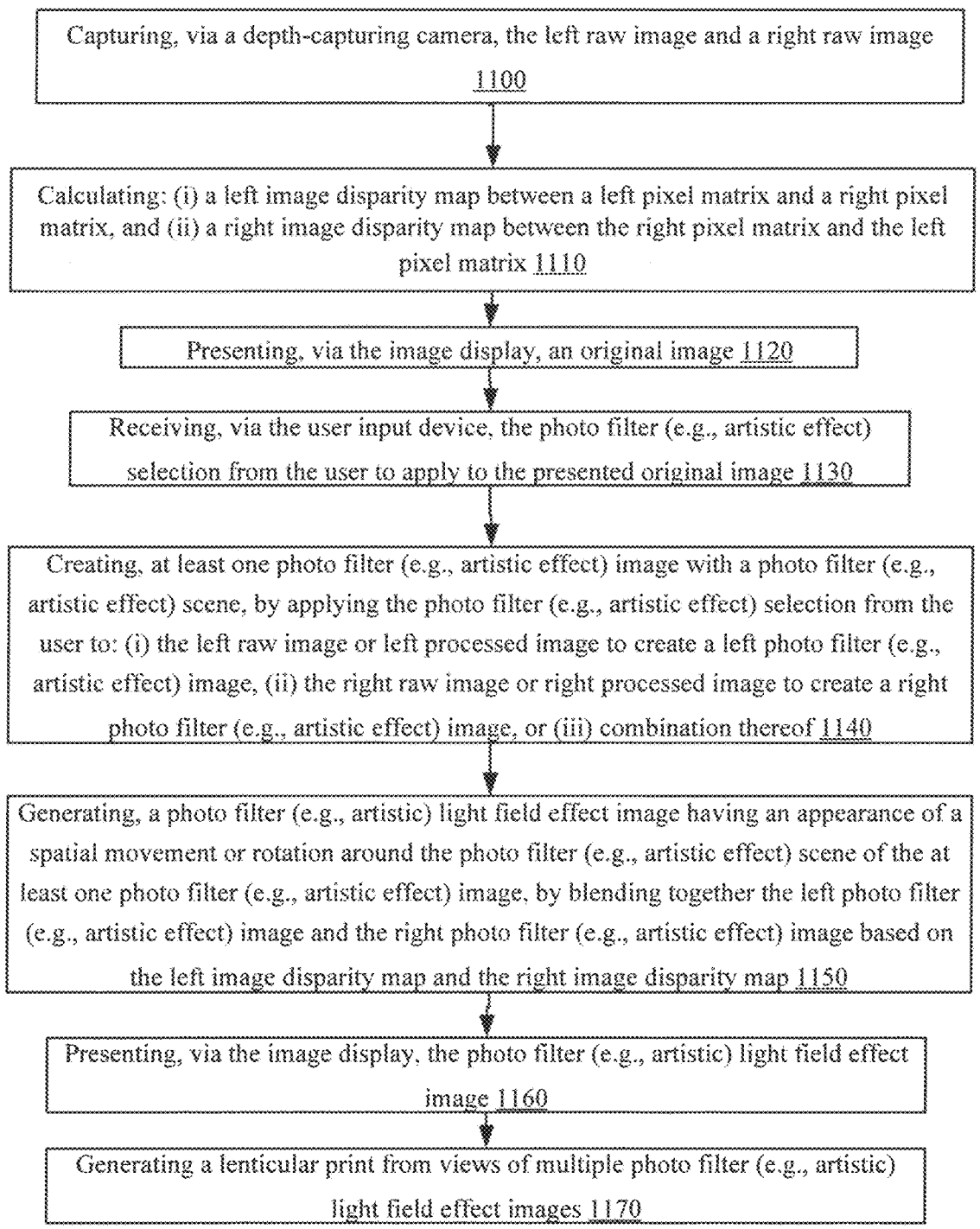
FIG. 11 is a flowchart of a method that can be implemented in the photo filter (e.g., artistic) light field effect system to apply to a raw image or a processed image to generate a photo filter light field effect image.

A flowchart outlining functions which can be implemented in the photo filter (e.g., artistic) light field effect programming 945 is shown in FIG. 11. Memory 934 further includes the two-dimensional input selection 962 (e.g., an initial touch point and a final touch point) received by the user input device 991. Memory 934 further includes: a left image disparity map 960A, a right image disparity map 960B, photo filter (e.g., artistic effect) images 963A-N, a horizontal position parameter 966, a left interpolated pixel matrix 967A that includes left moved X axis location coordinates 968A-N, a right interpolated pixel matrix 967B that includes right moved X axis location coordinates 969A-N, and a left processed (e.g., rectified) image 965A and a right processed (e.g., rectified) image 965B (e.g., to remove vignetting towards the end of the lens). As further shown, memory 934 includes a matrix of vertices 970 and a rotation matrix 974. Some or all of the stored information in the memory 934 can be generated during image processing of the raw images 858A-B to generate respective photo filter (e.g., artistic) light field effect images 964A-N.

As shown in FIG. 9, high-speed circuitry 930 includes high-speed processor 932, memory 934, and high-speed wireless circuitry 936. In the example, the image display driver 942 is coupled to the high-speed circuitry 930 and operated by the high-speed processor 932 in order to drive the left and right image displays of the optical assembly 180A-B. High-speed processor 932 may be any processor capable of managing high-speed communications and operation of any general computing system needed for eyewear device 100. High-speed processor 932 includes processing resources needed for managing high-speed data transfers on high-speed wireless connection 937 to a wireless local area network (WLAN) using high-speed wireless circuitry 936. In certain embodiments, the high-speed processor 932 executes an operating system such as a LINUX operating system or other such operating system of the eyewear device 100 and the operating system is stored in memory 934 for execution. In addition to any other responsibilities, the high-speed processor 932 executing a software architecture for the eyewear device 100 is used to manage data transfers with high-speed wireless circuitry 936. In certain embodiments, high-speed wireless circuitry 936 is configured to implement Institute of Electrical and Electronic Engineers (IEEE) 802.11 communication standards, also referred to herein as Wi-Fi. In other embodiments, other high-speed communications standards may be implemented by high-speed wireless circuitry 936.

Low-power wireless circuitry 924 and the high-speed wireless circuitry 936 of the eyewear device 100 can include short range transceivers (Bluetooth™) and wireless wide, local, or wide area network transceivers (e.g., cellular or WiFi). Mobile device 990, including the transceivers communicating via the low-power wireless connection 925 and high-speed wireless connection 937, may be implemented using details of the architecture of the eyewear device 100, as can other elements of network 995.

Memory 934 includes any storage device capable of storing various data and applications, including, among other things, camera data generated by the left and right visible light cameras 114A-B, infrared camera 220, and the image processor 912, as well as images generated for display by the image display driver 942 on the image displays of the optical assembly 180A-B. While memory 934 is shown as integrated with high-speed circuitry 930, in other embodiments, memory 934 may be an independent standalone element of the eyewear device 100. In certain such embodiments, electrical routing lines may provide a connection through a chip that includes the high-speed processor 932 from the image processor 912 or low-power processor 922 to the memory 934. In other embodiments, the high-speed processor 932 may manage addressing of memory 934 such that the low-power processor 922 will boot the high-speed processor 932 any time that a read or write operation involving memory 934 is needed.

Figure 10:
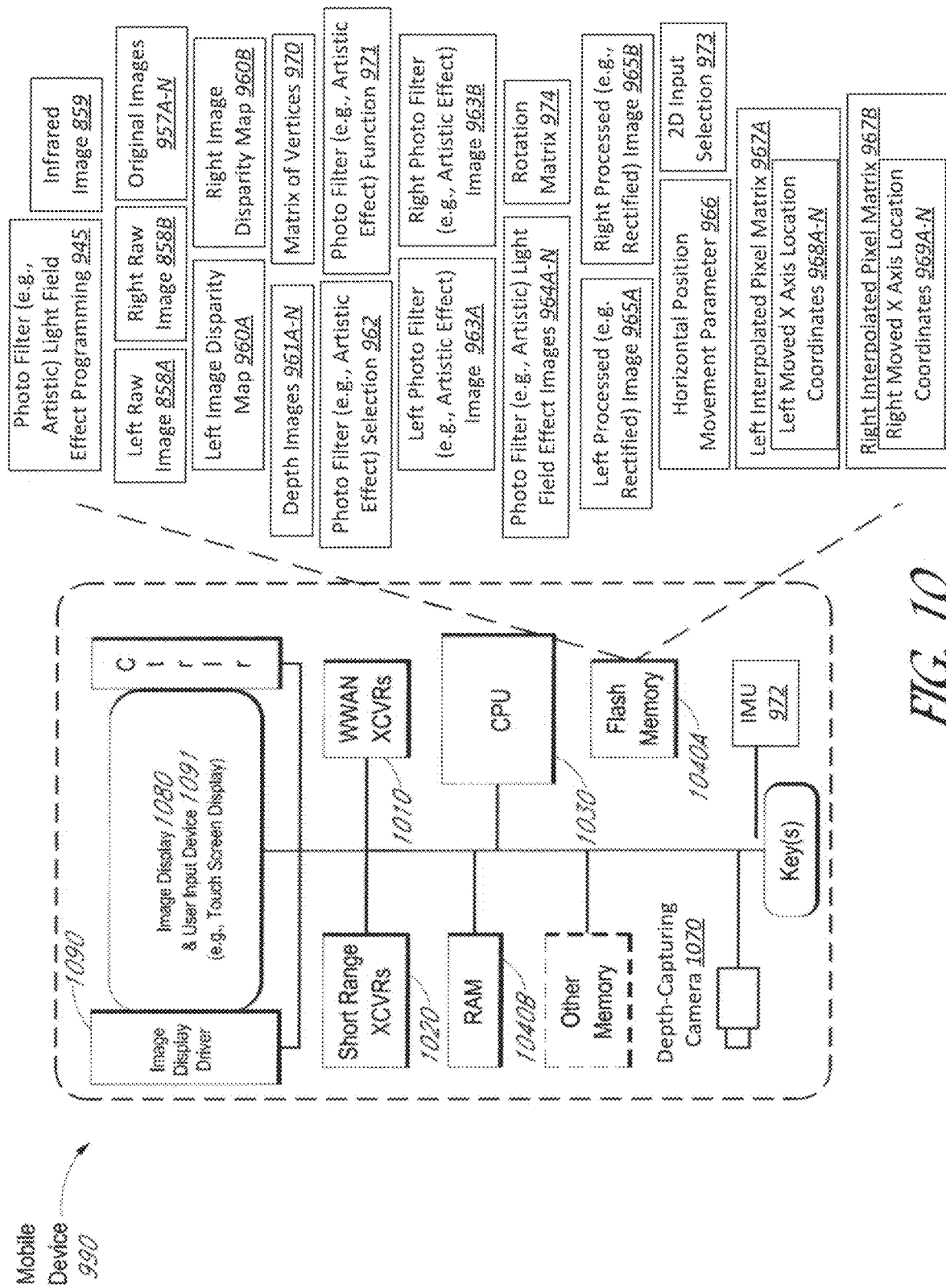
FIG. 10 shows an example of a hardware configuration for the mobile device of the photo filter (e.g., artistic) light field effect system of FIG. 9, which includes a user input device (e.g., touch screen device) to receive the photo filter selection to apply to a raw image or a processed image to generate a photo filter light field effect image.

As shown in FIG. 9, the processor 932 of the eyewear device 100 can be coupled to the depth-capturing camera (visible light cameras 114A-B; or visible light camera 114A, infrared emitter 215, and infrared camera 220), the image display driver 942, the user input device 991, and the memory 934. As shown in FIG. 10, the processor 1030 of the mobile device 990 can be coupled to the depth-capturing camera 1070, the image display driver 1090, the user input device 1091, and the memory 1040A. Eyewear device 100 can perform all or a subset of any of the following functions described below as a result of the execution of the photo filter (e.g., artistic) light field effect programming 945 in the memory 934 by the processor 932 of the eyewear device 100. Mobile device 990 can perform all or a subset of any of the following functions described below as a result of the execution of the photo filter (e.g., artistic) light field effect programming 945 in the memory 1040A by the processor 1030 of the mobile device 990. Functions can be divided in the photo filter (e.g., artistic) light field effect system 900, such that the eyewear device 100 generates the raw images 858A-B, but the mobile device 990 performs the remainder of the image processing on the raw images 858A-B to generate the photo filter (e.g., artistic) light field effect images 964A-N.

In one example, the depth-capturing camera of the eyewear device 100 includes the at least two visible light cameras comprised of a left visible light camera 114A with a left field of view 111A and a right visible light camera 114B with a right field of view 111B. The left field of view 111A and the right field of view 111B have an overlapping field of view 813 (see FIG. 8B). The depth-capturing camera 1070 of the mobile device 990 can be similarly structured.

Execution of the photo filter (e.g., artistic) light field effect programming 945 by the processor 932, 1030 configures the photo filter (e.g., artistic) light field effect system 900 to perform functions, including functions to capture, via the depth-capturing camera, the left raw image 858A and the right raw image 858B. Photo filter (e.g., artistic) light field effect system 900 calculates: (i) a left image disparity map 960A between a left pixel matrix of pixels and a right pixel matrix of pixels, and (ii) a right image disparity map 960B between the right pixel matrix and the left pixel matrix. The left raw image 858A or the left processed image 965A include the left pixel matrix, and the right raw image 858B or the right processed image 965B include the right pixel matrix.

Photo filter (e.g., artistic) light field effect system 900 presents, via the image display 180A-B, 1080, an original image 957A. Photo filter (e.g., artistic) light field effect system 900 receives, via the user input device 991, 1091, the artistic effect selection 962 from the user to apply to the presented original image 957A. Photo filter (e.g., artistic) light field effect system 900 creates, at least one artistic effect image with an artistic effect scene, by applying the artistic effect selection 962 from the user to: (i) the left raw image 858A or the left processed image 965A to create a left artistic effect image 963A, (ii) the right raw image 858B or the right processed image 965B to create a right artistic effect image 963B, or (iii) combination thereof.

Photo filter (e.g., artistic) light field effect system 900 generates, an artistic light field effect image 964A having an appearance of a spatial movement or rotation around the artistic effect scene of the at least one artistic effect image. This can be achieved by blending together the left artistic effect image 963A and the right artistic effect image 963B based on the left image disparity map 960A and the right image disparity map 960B. Photo filter (e.g., artistic) light field effect system 900 presents, via the image display 180A-B, 1080, the artistic light field effect image 964A.

The function of calculating the left image disparity map 960A and the right image disparity map 960B includes the following functions. First, creating a left rectified image 965A from the left raw image 858A as the left processed image 965A and a right rectified image 965B from the right raw image 858B as the right processed image 965B that align the left and right raw images 858A-B and remove distortion from a respective lens of each of the left and right visible light cameras 114A-B. Second, extracting the left image disparity map 960A and the right image disparity map 960B by correlating pixels in the left rectified image 965A with the right rectified image 965B and vice versa to calculate a disparity for each of the correlated pixels.

The function of generating the artistic light field effect image 964A includes the following functions. First, determining a horizontal position movement parameter 966 along an X axis of the left pixel matrix and the right pixel matrix. Second, filling up a left interpolated pixel matrix 967A by moving pixels in the left pixel matrix along the X axis based on the horizontal movement parameter 966. Third, filling up a right interpolated pixel matrix 967B by moving pixels in the right pixel matrix along the X axis based on the horizontal movement parameter 966. Fourth, creating the artistic light field effect image 964A by blending together the left interpolated pixel matrix 967A and the right interpolated pixel matrix 967B.

The function of filling up the left interpolated pixel matrix 967A includes the following functions. First, multiplying a respective left image disparity from the left image disparity map 960A of each respective pixel in the left pixel matrix by the horizontal movement parameter 966 to derive a respective left moved X axis location coordinate 968A-N. Second, moving each respective pixel to the respective left moved X axis location coordinate 968A-N in the left interpolated pixel matrix 967A.

The function of filling up the right interpolated pixel matrix 967B includes the following functions. First, multiplying a respective right image disparity from the right image disparity map 960B of each respective pixel in the right pixel matrix by a complement of the horizontal movement parameter 966 to derive a respective right moved X axis location coordinate 969A-N. For example, the complement of the horizontal movement parameter 966 is the number one minus the horizontal movement parameter 966. Second, moving each respective pixel to the respective right moved X axis location coordinate 969A-N in the right interpolated pixel matrix 967B.

The function of generating the artistic light field effect image 964A by blending together the left interpolated pixel matrix 967A and the right interpolated pixel matrix 967B is based on disparity confidence levels, gradients, or combination thereof in the left image disparity map 960A and the right image disparity map 960B. The disparity confidence level value is based, for instance, on the magnitude of correlation between the left and the right pixels. The function of determining the horizontal position movement parameter 966 includes the following functions. First, receiving, via the user input device 991, 1091, a two-dimensional input selection 973 of the presented original image 957A from the user. Second, tracking, via the user input device 991, 1091, motion of the two-dimensional input selection 973 from an initial touch point to a final touch point of the presented original image 957A. Third, determining a rotation matrix 974 that describes rotation from the initial touch point to the final touch point to derive the horizontal position movement parameter 966. However, it should be understood that there is no need for the rotation matrix 974 in the light field effect unless the data is represented using 3D vertices. In some examples, the horizontal position movement parameter 966 can also be determined from the IMU 972 measurements, e.g., using the tilt angle of the mobile device 990 or the eyewear device 100.

In one example, the user input device 991, 1091 includes a touch sensor including an input surface and a sensor array that is coupled to the input surface to receive at least one finger contact inputted from a user. User input device 991, 1091 further includes a sensing circuit integrated into or connected to the touch sensor and connected to the processor 932, 1030. The sensing circuit is configured to measure voltage to track the at least one finger contact on the input surface. The function of receiving, via the user input device 991, 1091, the artistic effect selection 962 from the user includes receiving, on the input surface of the touch sensor, the at least one finger contact inputted from the user. The function of tracking, via the user input device 991, 1091, motion of the two-dimensional input selection 973 from the initial touch point to the final touch point includes tracking, via the sensing circuit, drag from the at least one finger contact on the input surface from the initial touch point to the final touch point on the input surface of the touch sensor.

A touch-based user input device 991 can be integrated into the eyewear device 100. As noted above, eyewear device 100 includes a chunk 110A-B integrated into or connected to the frame 105 on the lateral side 170A-B of the eyewear device 100. The frame 105, the temple 125A-B, or the chunk 110A-B includes a circuit board that includes the touch sensor. The circuit board includes a flexible printed circuit board. The touch sensor is disposed on the flexible printed circuit board. The sensor array is a capacitive array or a resistive array. The capacitive array or the resistive array includes a grid that forms a two-dimensional rectangular coordinate system to track X and Y axes location coordinates.

In one example of the photo filter (e.g., artistic) light field effect system 900, the processor comprises a first processor 932 and a second processor 1030. The memory comprises a first memory 934 and a second memory 1040A. The eyewear device 100 includes a first network communication interface 924 or 936 for communication over a network 925 or 937 (e.g., a wireless short-range network or a wireless local area network). The first processor 932 is coupled to the first network communication interface 924 or 936. The first memory 934 is accessible to the first processor 932. Eyewear device 100 further includes photo filter (e.g., artistic) light field effect programming 945 in the first memory 934. Execution of the photo filter (e.g., artistic) light field effect programming 945 by the first processor 932 configures the eyewear device 100 to perform the function to capture, via the depth-capturing camera, the left raw image 858A and the right raw image 858B.

The photo filter (e.g., artistic) light field effect system 900 further comprises a host computer, such as the mobile device 990, coupled to the eyewear device 100 over the network 925 or 937. The host computer includes a second network communication interface 1010 or 1020 for communication over the network 925 or 937. The second processor 1030 is coupled to the second network communication interface 1010 or 1020. The second memory 1040A is accessible to the second processor 1030. Host computer further includes photo filter (e.g., artistic) light field effect programming 945 in the second memory 1040A.

Execution of the photo filter (e.g., artistic) light field effect programming 945 by the second processor 1030 configures the host computer to perform the functions to receive, via the second network communication interface 1010 or 1020, the original image 957A over the network 925 or 937 from the eyewear device 100. Execution of the photo filter (e.g., artistic) light field effect programming 945 by the second processor 1030 configures the host computer to calculate: (i) the left image disparity map 960A, and (ii) the right image disparity map 960B. Execution of the photo filter (e.g., artistic) light field effect programming 945 by the second processor 1030 configures the host computer to present, via the image display 1080, the original image 957A. Execution of the photo filter (e.g., artistic) light field effect programming 945 by the second processor 1030 configures the host computer to receive, via the user input device 1091 (e.g., touch screen or a computer mouse), the artistic effect selection 962 from the user. Execution of the photo filter (e.g., artistic) light field effect programming 945 by the second processor 1030 configures the host computer to create the artistic effect image 963A-B. Execution of the photo filter (e.g., artistic) light field effect programming 945 by the second processor 1030 configures the host computer to generate the artistic light field effect image 964A. Execution of the photo filter (e.g., artistic) light field effect programming 945 by the second processor 1030 configures the host computer to present, via the image display 1080, the artistic light field effect image 964A.

Depth images 961A-N are each formed of a matrix of vertices 970. Each pixel of the two-dimensional images 858A-B, 963A-B, 964A-N, 965A-B can be associated with a respective vertex of a matrix of vertices 970. Each vertex has a position attribute. The position attribute of each vertex is based on a three-dimensional location coordinate system and includes an X location coordinate on an X axis for horizontal position, a Y location coordinate on a Y axis for vertical position, and a Z location coordinate on a Z axis for a depth position. Each vertex further includes one or more of a color attribute, a texture attribute, or a reflectance attribute. Thus, the function of applying the artistic effect selection 962 from the user to: (i) the left raw image 858A or the left processed image 965A to create the left artistic effect image 963A, (ii) the right raw image 858B or the right processed image 965B to create the right artistic effect image 963B, or (iii) combination thereof is based on the Z location coordinate to vary a filtering effect strength of an artistic effect function 971 to transform each pixel depending on the depth position of the respective vertex associated with each pixel. The filtering effect strength is applied more strongly to the respective vertex having the Z location coordinate with a deeper depth position on the Z axis compared to having a shallower depth position on the Z axis.

Server system 998 may be one or more computing devices as part of a service or network computing system, for example, that include a processor, a memory, and network communication interface to communicate over the network 995 with the mobile device 990 and eyewear device 100. Eyewear device 100 is connected with a host computer. For example, the eyewear device 100 is paired with the mobile device 990 via the high-speed wireless connection 937 or connected to the server system 998 via the network 995.

Lenticular prints can be fabricated from the generated photo filter (e.g., artistic) light field effect images 964A-N by generating multiple (e.g., ten 964A-J) views in between the left and right images 858A-B, 965A-B for a particular moment. The multiple views (each view corresponding to a generated photo filter light field effect image 964A-J) are printed in stripes. A lenticular sheet, which is plastic, is glued on the lenticular print with half tubes that act like lenses. When an observer looks with two eyes, each eye sees a different set of stripes, and thus views a different image 964A-J. By having several (ten) views 964A-J and gluing the lenticular sheet on top, a lenticular print is created to provide a 3D appearance. Moving the lenticular print provides an effect of different viewpoints, which provides a short animation within the lenticular print. A photo printing service (implemented by host computer, such as server system 998 or mobile device 990) may receive over a network 925, 937, 995, multiple generated photo filter (e.g., artistic) light field effect images 964A-N, which can be printed out as a lenticular print (e.g., using a 3D printer). In some examples, the lenticular print may stitch together photo filter (e.g., artistic) light field effect images 964A-N in a sequence to form a short video.

For example, N viewpoints, 0.1, 0.2, until 1 are created to generate ten views corresponding to ten photo filter (e.g., artistic) light field effect images 964A-J. Printer ordering is as follows: the first column of the first view 964A, first column of the second view 964B, etc. until 964J; then the next pixel column, which is the second column of the first view 964A, second column of the second view 964B, etc. until 964J. A lenticular sheet is glued on the print, such that each image until 964A-J is seen at a different angular orientation. When the user rotates the lenticular print, the ten different views until 964A-J are rotated between.

Output components of the eyewear device 100 include visual components, such as the left and right image displays of optical assembly 180A-B as described in FIGS. 2B-C (e.g., a display such as a liquid crystal display (LCD), a plasma display panel (PDP), a light emitting diode (LED) display, a projector, or a waveguide). The image displays of the optical assembly 180A-B are driven by the image display driver 942. The output components of the eyewear device 100 further include acoustic components (e.g., speakers), haptic components (e.g., a vibratory motor), other signal generators, and so forth. The input components of the eyewear device 100, the mobile device 990, and server system 998, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

Eyewear device 100 may optionally include additional peripheral device elements. Such peripheral device elements may include biometric sensors, additional sensors, or display elements integrated with eyewear device 100. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over wireless connections 925 and 937 from the mobile device 990 via the low-power wireless circuitry 924 or high-speed wireless circuitry 936.

Inertial measurement unit (IMU) 972 is an electronic device that measures and reports a body's specific force, angular rate, and sometimes the magnetic field surrounding the body, using a combination of accelerometers and gyroscopes, sometimes also magnetometers. If a magnetometer is present, the magnetic field can be used as input to detect specific gestures that are dependent on Earth's or an artificial magnetic field. In this example, the inertial measurement unit determines a rotation acceleration of the eyewear device 100. The inertial measurement unit 972 works by detecting linear acceleration using one or more accelerometers and rotational rate using one or more gyroscopes. Typical configurations of inertial measurement units contain one accelerometer, gyroscope, and magnetometer per axis for each of the three axes: horizontal axis for left-right movement (X), vertical axis (Y) for top-bottom movement, and depth or distance axis for up-down movement (Z). The gyroscope detects the rate of rotation around 3 axes (X, Y, and Z). The magnetometer detects the magnetic field (e.g., facing south, north, etc.) like a compass which generates a heading reference, which is a mixture of Earth's magnetic field and other artificial magnetic field (such as ones generated by power lines). The three accelerometers detect acceleration along the horizontal (X), vertical (Y), and depth or distance (Z) axes defined above, which can be defined relative to the ground, the eyewear device 100, the depth-capturing camera, or the user wearing the eyewear device 100. Thus, the accelerometer detects a 3-axis acceleration vector, which then can be used to detect Earth's gravity vector.

FIG. 10 is a high-level functional block diagram of an example of a mobile device 990 that communicates via the photo filter (e.g., artistic) light field effect system 900 of FIG. 9. Mobile device 990 includes a user input device 1091 to receive a photo filter (e.g., artistic effect) selection 962 or two-dimensional input selection 973 to apply to an original image 957A to generate a photo filter (e.g., artistic) light field effect image 964A.

Mobile device 990 includes a flash memory 1040A which includes photo filter (e.g., artistic) light field effect programming 945 to perform all or a subset of the functions described herein for producing photo filter (e.g., artistic) light field effects, in which a photo filter selection 962 from a user is applied to raw images 858A-B or processed images 965A-B to generate photo filter light field effect images 964A-N.

As shown, memory 1040A further includes a left raw image 858A captured by left visible light camera 114A, a right raw image 858B captured by right visible light camera 114B, and an infrared image 859 captured by infrared camera 220 of the depth sensor 213. Mobile device 1090 can include a depth-capturing camera 1070 that comprises at least two visible light cameras (first and second visible light cameras with overlapping fields of view) or at least on visible light camera and a depth sensor with substantially overlapping fields of view like the eyewear device 100. When the mobile device 990 includes components like the eyewear device 100, such as the depth-capturing camera, the left raw image 858A, the right raw image 858B, and the infrared image 859 can be captured via the depth-capturing camera 1070 of the mobile device 990.

Memory 1040A further includes multiple depth images 961A-N, which are generated, via the depth-capturing camera of the eyewear device 100 or via the depth-capturing camera 1070 of the mobile device 990 itself. A flowchart outlining functions which can be implemented in the photo filter (e.g., artistic) light field effect programming 945 is shown in FIG. 11. Memory 1040A further includes a two-dimensional input selection 973, such as an initial touch point and a final touch point received by the user input device 1091. Memory 1040A further includes: a left image disparity map 960A, a right image disparity map 960B, photo filter (e.g., artistic effect) images 963A-N, a horizontal position parameter 966, a left interpolated pixel matrix 967A that includes left moved X axis location coordinates 968A-N, a right interpolated pixel matrix 967B that includes right moved X axis location coordinates 969A-N, left processed (e.g., rectified) and right processed (e.g., rectified) images 969A-B (e.g., to remove vignetting towards the end of the lens). As further shown, memory 1040A includes a matrix of vertices 970 and a rotation matrix 974. Some or all of the stored information in the memory 1040A can be generated during image processing of the raw images 858A-B to generate respective photo filter (e.g., artistic) light field effect images 964A-N.

As shown, the mobile device 990 includes an image display 1080, an image display driver 1090 to control the image display, and a user input device 1091 similar to the eyewear device 100. In the example of FIG. 10, the image display 1080 and user input device 1091 are integrated together into a touch screen display.

Examples of touch screen type mobile devices that may be used include (but are not limited to) a smart phone, a personal digital assistant (PDA), a tablet computer, a laptop computer, or other portable device. However, the structure and operation of the touch screen type devices is provided by way of example; and the subject technology as described herein is not intended to be limited thereto. For purposes of this discussion, FIG. 10 therefore provides block diagram illustrations of the example mobile device 990 having a touch screen display for displaying content and receiving user input as (or as part of) the user interface.

The activities that are the focus of discussions here typically involve data communications related to applying a photo filter selection 962 from a user to raw images 858A-B or processed images 965A-B to generate photo filter light field effect images 964A-N in the portable eyewear device 100 or the mobile device 990. As shown in FIG. 10, the mobile device 990 includes at least one digital transceiver (XCVR) 1010, shown as WWAN XCVRs, for digital wireless communications via a wide area wireless mobile communication network. The mobile device 990 also includes additional digital or analog transceivers, such as short range XCVRs 1020 for short-range network communication, such as via NFC, VLC, DECT, ZigBee, Bluetooth™, or WiFi. For example, short range XCVRs 1020 may take the form of any available two-way wireless local area network (WLAN) transceiver of a type that is compatible with one or more standard protocols of communication implemented in wireless local area networks, such as one of the Wi-Fi standards under IEEE 802.11 and WiMAX.

To generate location coordinates for positioning of the mobile device 990, the mobile device 990 can include a global positioning system (GPS) receiver. Alternatively, or additionally the mobile device 990 can utilize either or both the short range XCVRs 1020 and WWAN XCVRs 1010 for generating location coordinates for positioning. For example, cellular network, WiFi, or Bluetooth™ based positioning systems can generate very accurate location coordinates, particularly when used in combination. Such location coordinates can be transmitted to the eyewear device over one or more network connections via XCVRs 1010, 1020.

The transceivers 1010, 1020 (network communication interfaced) conform to one or more of the various digital wireless communication standards utilized by modern mobile networks. Examples of WWAN transceivers 1010 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 1010, 1020 provide two-way wireless communication of information including digitized audio signals, still image and video signals, web page information for display as well as web related inputs, and various types of mobile message communications to/from the mobile device 990 for photo filter (e.g., artistic) light field effect.

Several of these types of communications through the transceivers 1010, 1020 and a network, as discussed previously, relate to protocols and procedures in support of communications with the eyewear device 100 or the server system 998 for generating photo filter (e.g., artistic) light field effect images 964A-N, such as transmitting left raw image 858A, right raw image 858B, infrared image 859, depth images 961A-N, photo filter images 963A-B, and processed (e.g., rectified) images 965A-B. Such communications, for example, may transport packet data via the short range XCVRs 1020 over the wireless connections 925 and 937 to and from the eyewear device 100 as shown in FIG. 9. Such communications, for example, may also transport data utilizing IP packet data transport via the WWAN XCVRs 1010 over the network (e.g., Internet) 995 shown in FIG. 9. Both WWAN XCVRs 1010 and short range XCVRs 1020 connect through radio frequency (RF) send-and-receive amplifiers (not shown) to an associated antenna (not shown).

The mobile device 990 further includes a microprocessor, shown as CPU 1030, sometimes referred to herein as the host controller. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The processor 1030, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU 1030 or processor hardware in smartphone, laptop computer, and tablet.

The microprocessor 1030 serves as a programmable host controller for the mobile device 990 by configuring the mobile device 990 to perform various operations, for example, in accordance with instructions or programming executable by processor 1030. For example, such operations may include various general operations of the mobile device, as well as operations related to the photo filter (e.g., artistic) light field effect programming 945 and communications with the eyewear device 100 and server system 998. Although a processor may be configured by use of hard-wired logic, typical processors in mobile devices are general processing circuits configured by execution of programming.

The mobile device 990 includes a memory or storage device system, for storing data and programming. In the example, the memory system may include a flash memory 1040A and a random access memory (RAM) 1040B. The RAM 1040B serves as short term storage for instructions and data being handled by the processor 1030, e.g., as a working data processing memory. The flash memory 1040A typically provides longer term storage.

Hence, in the example of mobile device 990, the flash memory 1040A is used to store programming or instructions for execution by the processor 1030. Depending on the type of device, the mobile device 990 stores and runs a mobile operating system through which specific applications, including photo filter (e.g., artistic) light field effect programming 945, are executed. Applications, such as the photo filter (e.g., artistic) light field effect programming 945, may be a native application, a hybrid application, or a web application (e.g., a dynamic web page executed by a web browser) that runs on mobile device 990 to generate photo filter (e.g., artistic) light field effect images 964A-N based on the received photo filter (e.g., artistic effect) selection 962. Examples of mobile operating systems include Google Android, Apple iOS (I-Phone or iPad devices), Windows Mobile, Amazon Fire OS, RIM BlackBerry operating system, or the like.

It will be understood that the mobile device 990 is just one type of host computer in the photo filter (e.g., artistic) light field effect system 900 and that other arrangements may be utilized. For example, a server system 998, such as that shown in FIG. 9, may generate the photo filter (e.g., artistic) light field effect image 964A after generation of the raw images 858A-B, via the depth-capturing camera of the eyewear device 100.

FIG. 11 is a flowchart of a method with steps that can be implemented in the photo filter (e.g., artistic) light field effect system 900 to apply a photo filter selection 962 from a user to raw images 858A-B or processed images 965A-B to generate photo filter (e.g., artistic) light field effect images 964A-N. Beginning in block 1100, the method includes capturing, via a depth-capturing camera, a left raw image 858A and a right raw image 858B, for example. For example, left visible light camera 114A and right visible light camera 114B capture the left raw image 858A and the right raw image 858B, respectively. Proceeding now to block 1110, the method further includes calculating: (i) a left image disparity map 960A between a left pixel matrix and a right pixel matrix, and (ii) a right image disparity map 960B between the right pixel matrix and the left pixel matrix. The left pixel matrix is based on the left raw image 858A or a left processed image 965A. The right pixel matrix is based on the right raw image 858B or a right processed image 965B.

The step of calculating the left image disparity map 960A and the right image disparity map 960B includes the following steps. First, creating a left rectified image 965A from the left raw image 858A as the left processed image 965A and a right rectified image 965B from the right raw image 858B as the right processed image 965B that align the left and right raw images 858A-B and remove distortion from a respective lens of each of the left and right visible light cameras 114A-B. Second, extracting the left image disparity map 960A and the right image disparity map 960B by correlating pixels in the left rectified image 965A with the right rectified image 965B and vice versa to calculate a disparity for each of the correlated pixels (e.g., using SGBM).

Rectification is applied so that each captured image or video is modified so that corresponding pixels lie on the same raster line (row). Once this is done, the image disparity computation algorithm, such as SGBM is applied. The disparity computation algorithm finds a corresponding pixel for each pixel in the left image in the right image. And for each pixel in the right image, finds a corresponding pixel in the left image. Usually the same disparity is found from left to right and right to left for non-occluded pixels (pixels seen from both cameras); however, occluded pixels are treated separately, typically by neighbor pixel blending techniques.

Continuing to block 1120, the method further includes presenting, via the image display 180A-B, 1080 an original image 957A. The original image 957A is based on the left raw image 858A, the left processed image 965A, the right raw image 858B, the right processed image 965B, or combination thereof. Moving to block 1130, the method further includes receiving, via the user input device 991, 1091, a photo filter selection 962 from the user to apply to the presented original image 957A.

Proceeding to block 1140, the method further includes creating, at least one photo filter image 963A-B with a photo filter scene. This is done by applying the photo filter selection from the user to: (i) the left raw image 858A or the left processed image 965A to create a left photo filter image 963A, (ii) the right raw image 858B or the right processed image 965B to create a right photo filter image 963B, or (iii) combination thereof.

Continuing to block 1150, the method further includes generating, a photo filter light field effect image 964A having an appearance of a spatial movement or rotation around the photo filter scene of the at least one photo filter light field effect image 963A-B. This can be achieved by blending together the left photo filter image 963A and the right photo filter image 963B based on the left image disparity map 960A and the right image disparity map 960B. The step of generating the photo filter light field effect image 964A includes the following steps. First, determining a horizontal position movement parameter 966 along an X axis of the left pixel matrix and the right pixel matrix. Second, filling up a left interpolated pixel matrix 967A by moving pixels in the left pixel matrix along the X axis based on the horizontal movement parameter 966. Third, filling up a right interpolated pixel matrix 967B by moving pixels in the right pixel matrix along the X axis based on the horizontal movement parameter 966. Fourth, creating the photo filter light field effect image 964A by blending together the left interpolated pixel matrix 967A and the right interpolated pixel matrix 967B.

The step of filling up the left interpolated pixel matrix 967A includes the following functions. First, multiplying a respective left image disparity from the left image disparity map 960A of each respective pixel in the left pixel matrix by the horizontal movement parameter 966 to derive a respective left moved X axis location coordinate 968A-N. Second, moving each respective pixel to the respective left moved X axis location coordinate 968A-N in the left interpolated pixel matrix 967A.

The step of filling up the right interpolated pixel matrix 967B includes the following steps. First, multiplying a respective right image disparity from the right image disparity map 960B of each respective pixel in the right pixel matrix by a complement of the horizontal movement parameter 966 (e.g., subtract the horizontal movement parameter 966 from the number one) to derive a respective right moved X axis location coordinate 969A-N. Second, moving each respective pixel to the respective right moved X axis location coordinate 969A-N in the right interpolated pixel matrix 967B.

Once two disparity maps are created (one left image disparity map 960A and one right image disparity map 960B), the horizontal movement parameter 966 moves between 0 and 1 to set or skew the spatial movement or rotation of the generated photo filter (e.g., artistic) light field effect image 964A. Suppose horizontal movement parameter 966 set to 0 skews to the left image completely and horizontal movement parameter 966 set to 1 skews to the right image completely. If horizontal movement parameter 966 is set to 0, then the weight is set to output the left image as the photo filter (e.g., artistic) light field effect image 964A. If horizontal movement parameter 966 is set to 1, then the weight is set to output the right image as the photo filter (e.g., artistic) light field effect image 964A. When photo filter (e.g., artistic) light field effect image 964A is not equal to 0 or 1 (at intermediate values), the spatial movement or rotation is somewhat in between the left and right images. For a horizontal movement parameter 966 set to 0.5, empty interpolated pixel matrices 967A-B are filled up with RGB values to derive intermediate photo filter (e.g., artistic) light field effect images 964A-N. For the left interpolated pixel matrix 967A, since horizontal movement parameter 966 is set to 0.5, the pixels in the left image are moved halfway to the corresponding pixel in the right image according to the respective disparity value from the left image disparity map 960A. For example, the respective disparity value from the left image disparity map 960A is multiplied by 0.5 and added to the X axis location coordinate to derive the left moved X axis location coordinate 968A. The right interpolated pixel matrix 967B is filled up in the same manner by moving the pixels in the right image halfway to the corresponding pixel in the left image according to the respective disparity value from the right image disparity map 960B. For example, the respective disparity value from the right image disparity map 960B is multiplied by 0.5 and added to the X axis location coordinate to derive the right moved X axis location coordinate 969A. So, for each pixel, the color value stays the same, but the X axis location coordinate is moved on the X axis by half of the disparity value. If a pixel has no value (occluded), but neighbor pixels have values, a pixel value is calculated for the occluded pixel based on the weighted neighbor pixels together with a disparity confidence level.

In another example, assume the horizontal movement parameter 966 is set to 0.1 To fill up the left interpolated pixel matrix 967A the following calculation is used: for each left pixel in the left image, the respective disparity value from the left image disparity map 960A is multiplied by 0.1 to derive the respective left moved X axis location coordinate 968A-N. To fill up the right interpolated pixel matrix 967B the following calculation is used: for each right pixel in the right image, the respective disparity value from the right image disparity map 960B is multiplied by 0.9 derive the respective right moved X axis location coordinate 969A-N. This creates a novel view in between the left and right images.

The step of generating the photo filter (e.g., artistic) light field effect image 964A is achieved by blending together the left interpolated pixel matrix 967A and the right interpolated pixel matrix 967B. This blending is based on disparity confidence levels (e.g., by weighing contributions of each side), gradients, or combination thereof in the left image disparity map 960A and the right image disparity map 960B. The disparity confidence level value is based, for instance, on the magnitude of correlation between the left and the right pixels. Although one might expect to obtain the same image, the combined photo filter (e.g., artistic) light field effect image 964A is not the same due to reflection, illumination, etc. being different from the varying perspectives in the left image and the right image (hence, the term light field effects). This creates the photo filter (e.g., artistic) light field effect image 964A with the novel view.

In the generation of the photo filter (e.g., artistic) light field effect image 964A actual distance or depth is not used to rotate and the 3D vertices are not used. Instead, disparity is used, which is related to depth, but disparity is not directly depth. Rather, disparity is just a movement of pixels, which means the image processing can be done in the 2D space to speed up runtime and reduce memory requirements. There need not be any transformation into 3D, rather there are corresponding pixels and interpolation between the corresponding pixels. While the correspondence (disparity), can translate into depth (distance), depth is not needed for this photo filter (e.g., artistic) light field effect. Whether the depth on the Z axis is 10 meters or 20 meters does not matter, the pixel is moved to a different X axis location coordinate depending on the horizontal movement parameter 966.

Moving to block 1160, the method further includes presenting, via the image display 180A-B, 1080, the photo filter light field effect image 964A. In some examples, the step of capturing, via the depth-capturing camera, the left raw image 858A and the right raw image 858B is implemented on an eyewear device 100. The steps of calculating: (i) the left image disparity map 960A, and (ii) the right image disparity map 960B; presenting, via the image display 1080, the original image 957A; receiving, via the user input device 1091, the photo filter effect selection 962; creating the photo filter image 963A-B; generating, the photo filter light field effect image 964A; and presenting, via the image display 1080, the photo filter light field effect image 964A are implemented on a host computer 990, 998.

The step of applying the artistic effect selection 962 from the user to: (i) the left raw image 858A or the left processed image 965A to create the left artistic effect image 963A, (ii) the right raw image 858B or the right processed image 965B to create the right artistic effect image 963B, or (iii) combination thereof can be based on the Z location coordinate. This can vary a filtering effect strength of an artistic effect function 971 to transform each pixel depending on the depth position of the respective vertex associated with each pixel. The filtering effecting strength is applied more strongly to the respective vertex having the Z location coordinate with a deeper depth position on the Z axis compared to having a shallower depth position on the Z axis.

Finishing now in block 1170, the method can further include generating a lenticular print from views of multiple photo filter (e.g., artistic) light field effect images 964A-N. Lenticular printing is used two create 3D images from a left image and a right image and all images in between. In an example, fifteen different views 964A-0 can be packed together, so when the lenticular print is moved around a hologram like image appears. With light field effect image, various light field effect image views can be printed to provide a hologram (moving image) experience. To transfer to a lenticular print, e.g., fifteen end views 964A-O, are generated and then printed such that each pixel of the lenticular print takes the first pixel of first light field effect image, first pixel of the second light field effect image, up to the first pixel of the Nth light field effect image. Next, the second pixel of first light field effect image, second pixel of the second light field effect image, up to the second pixel of the Nth light field effect image are printed. This provides stripes of all N images. When the lenticular print sheet is made, the lenses direct light from each stripe to the viewer's eyes. When looking at each image with a lenticular sheet on top, the full light field effect image from that single view is observed. But when the lenticular print is moved, the lens causes each eye to see a different image because the light is directed in a different direction. When the viewer looks with both eyes, two different views appear, which provides a 3D experience.

FIG. 12A illustrates an example of a first presented original image 957A, which is a processed (e.g., rectified) image 965A. The first presented original image 957A includes various two-dimensional pixels with X and Y location coordinates on an X axis 1205 and a Y axis 1210.

FIG. 12B illustrates an example of a photo filter (e.g., artistic effect) image 963 created from the first presented original image 957A of FIG. 12A. As shown, applying the artistic effect selection 962 from the user to the first presented original image 957A is based on a first photo filter (e.g., artistic effect) function 971A that transforms each pixel of the first presented original image 957A to create an artistic effect scene. The photo filter (e.g., artistic effect) function 971 adds the painting "The Scream," 1983 by Edvard Munch as the artistic effect scene.

FIG. 12C illustrates an example of a first photo filter (e.g., artistic) light field effect image 964A generated from the photo filter (e.g., artistic effect) image 963 of FIG. 12B, in which the spatial movement or rotation is skewed to the left. As shown, the horizontal movement parameter 966 is skewed to the left. Thus, space is shown between the human object 1220 and the floor mat 1225 of the artistic effect scene.

FIG. 12D illustrates an example of a second photo filter (e.g., artistic) light field image 964B generated from the photo filter image 963 of FIG. 12B, in which the spatial movement or rotation is skewed to the right. As shown, the horizontal movement parameter 966 is skewed to the right. Thus, no space is shown between the human object 1220 and the floor mat 1225 of the artistic effect scene.

Left and right disparity maps are computed from the original RGB images. To obtain the light field effect of rotating around the artistic image to have spatial movement, two modified images together or one modified and one unmodified RGB image may be blended together. When two or one of the corresponding pixels are modified in the left and right images, the unmodified image disparity, that is, the pre-calculated disparity based on unmodified images is used to achieve the light field effect.

FIG. 13A illustrates an example of a second presented original image 957B, which is a processed (e.g., rectified) image 965A. FIG. 13B illustrates an example of a first photo filter (e.g., artistic effect) image 963A created from the second presented original image 957B of FIG. 13A by varying a filtering effect strength 1330 based on depth. A first photo filter (e.g., artistic effect) function 971A adds an oil painting as the artistic effect scene. The application of a corresponding first artistic effect selection 962A to the second presented original image 957B is based on the Z location coordinate to vary a filtering effect strength 1330 of the first artistic effect function 971A to transform each pixel depending on the depth position of the respective vertex associated with each pixel. The filtering effecting strength 1330 is applied more strongly to the respective vertex having the Z location coordinate with a deeper depth position on the Z axis compared to having a shallower depth position on the Z axis.

Hence, the individuals on the Venice Beach boardwalk are walking away and appear as if those persons are walking into the oil painting. To produce this distance effect, the entire second presented original image 957B is modified with the first photo filter (e.g., artistic effect) function 971A and is then blended with the unmodified second presented original image 957B according to depth (Z axis). The more distant the pixel, the higher weight is given to the modified image, the closer the pixel the higher weight is given to the unmodified image, which ultimately produces the first photo filter (e.g., artistic effect) image 963A.

Figure 13C:
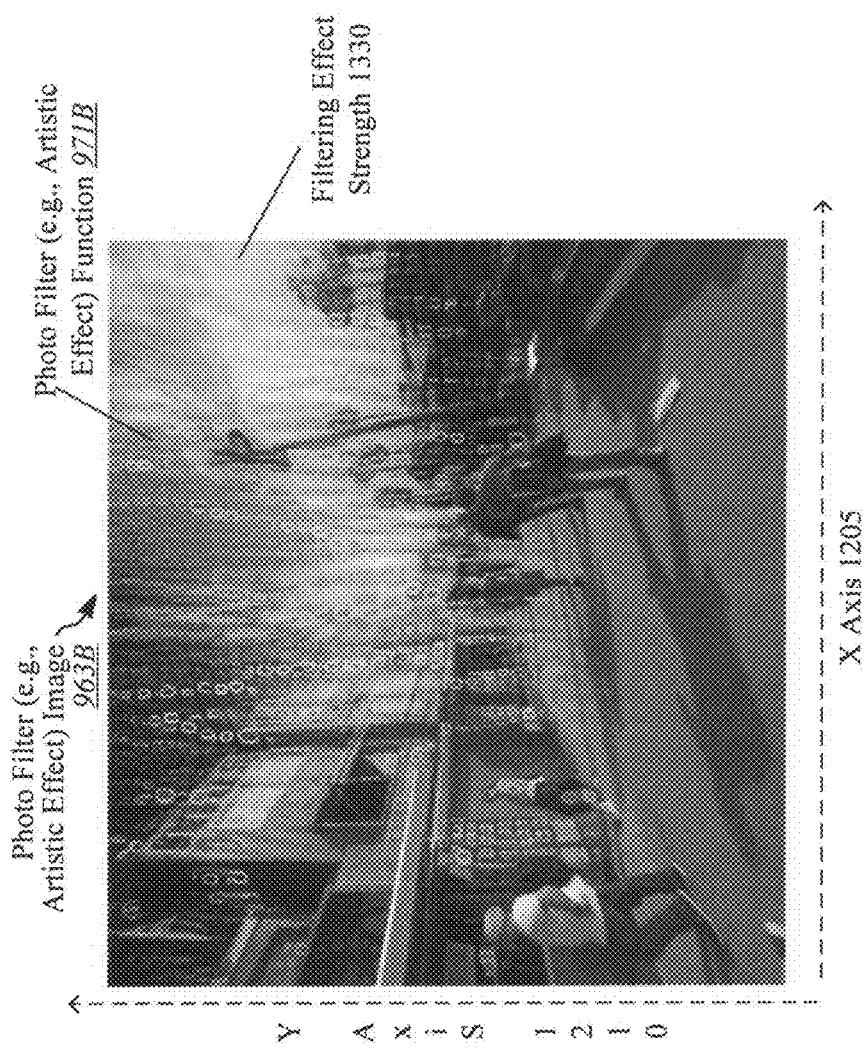
FIG. 13C illustrates an example of a second photo filter (e.g., artistic effect) image created from the second presented original image of FIG. 13A by varying a filtering effect strength based on depth.

FIG. 13C illustrates an example of a second photo filter (e.g., artistic effect) image 963B created from the second presented original image 957B of FIG. 13A by varying a filtering effect strength 1330 based on depth like FIG. 13B. A second photo filter (e.g., artistic effect) function 971B adds animation from the famous movie "The Matrix," 1999 starring Keanu Reeves as the artistic effect scene.

Figure 13D:
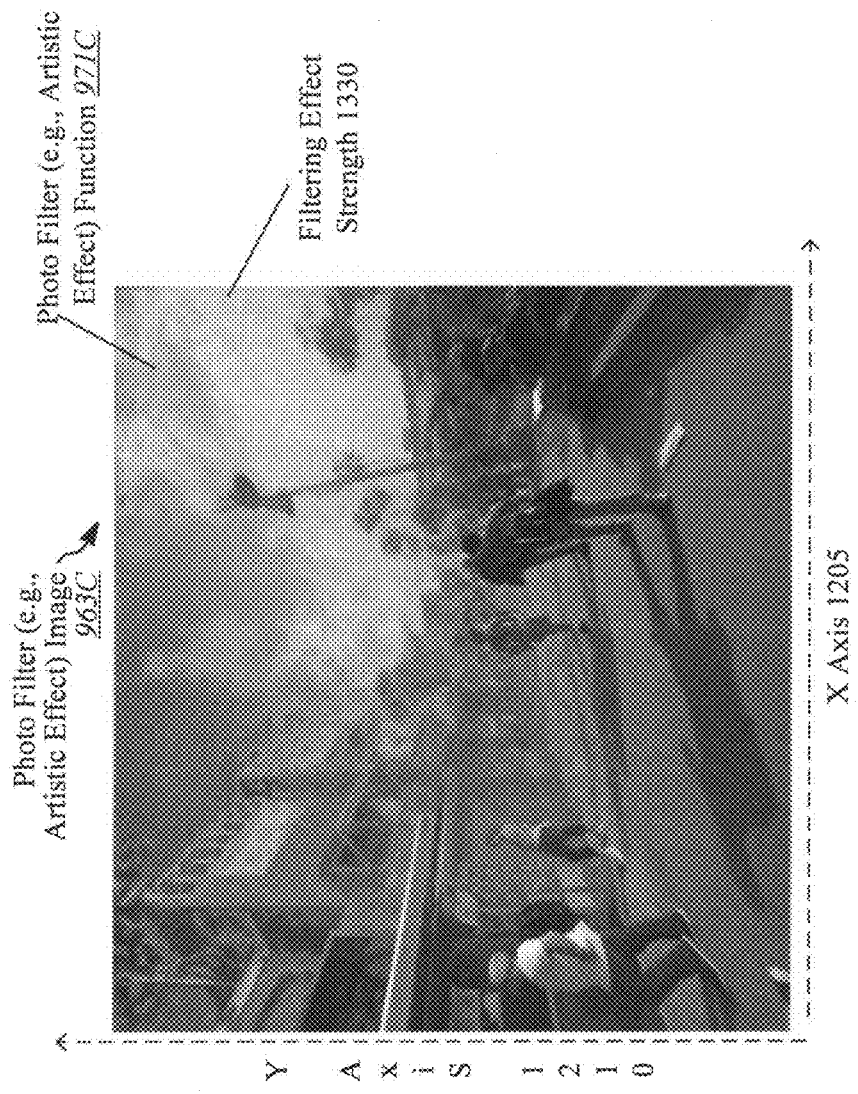
FIG. 13D illustrates an example of a third photo filter (e.g., artistic effect) image created from the second presented original image of FIG. 13A by varying a filtering effect strength based on depth.
Figure 13E:
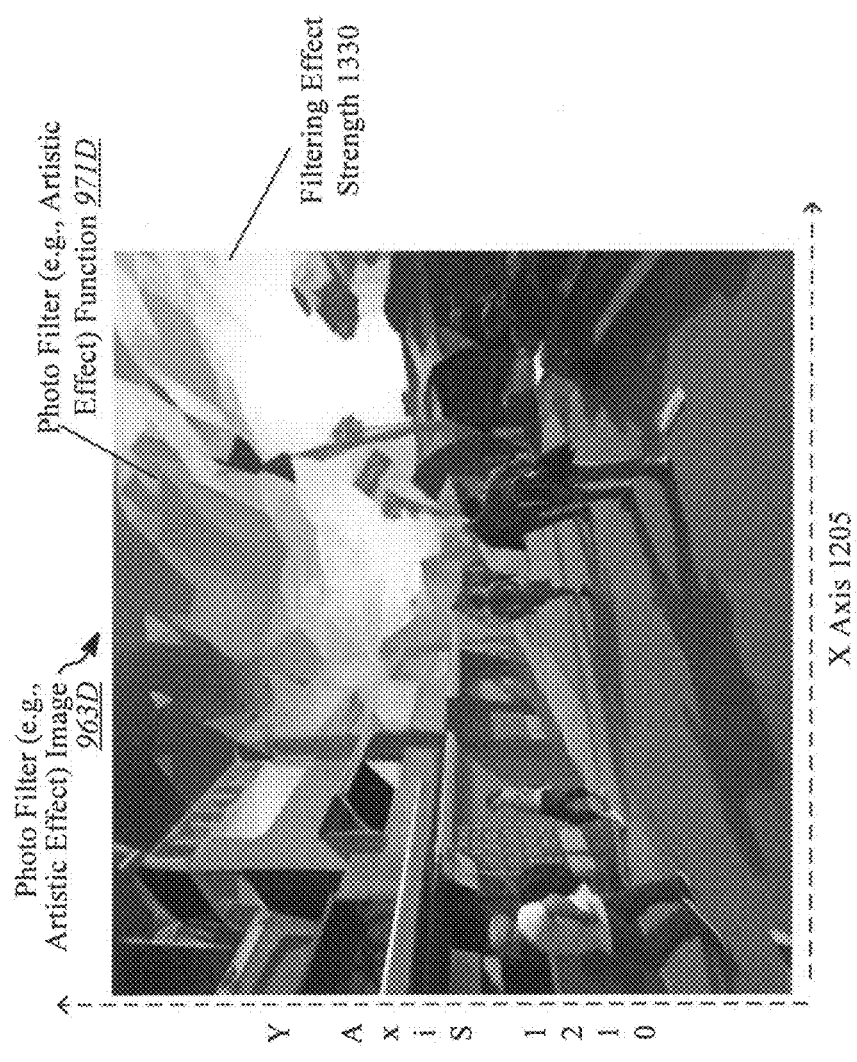
FIG. 13E illustrates an example of a fourth photo filter (e.g., artistic effect) image created from the second presented original image of FIG. 13A by varying a filtering effect strength based on depth.

FIG. 13D illustrates another example of a third photo filter (e.g., artistic effect) image 963C created from the second presented original image 957B of FIG. 13A by varying a filtering effect strength 1330 based on depth like FIGS. 13B-C. A third photo filter (e.g., artistic effect) function 971C adds fire as the artistic effect scene. FIG. 13E illustrates an example of a fourth photo filter (e.g., artistic effect) image 963D created from the second presented original image 957B of FIG. 13A by varying a filtering effect strength 1330 based on depth like FIGS. 13B-D. A fourth photo filter (e.g., artistic effect) function 971D adds polygon shapes as the artistic effect scene. As shown in FIGS. 13B-E, the photo filter (e.g., artistic effect) function 971B-C applies the photo filter (artistic) effects based on depth. For example, the extent to which "The Matrix" artistic effect of FIG. 13C and the on fire artistic effect of FIG. 13D is applied is based on distance.

FIG. 14A illustrates an example of a third presented original image 957C, which is a processed (e.g., rectified) image 965A. FIG. 14B illustrates an example of a photo filter (e.g., artistic effect) image 963 created from the third presented original image 957C of FIG. 14A by varying a filtering effect strength based on depth like FIGS. 13B-E. A fifth photo filter (e.g., artistic effect) function 971E adds radial or curved colored shapes as the artistic effect scene.

Any of the photo filter (e.g., artistic) light field effect functionality described herein for the eyewear device 100, mobile device 990, and server system 998 can be embodied in one more applications as described previously. According to some embodiments, "function," "functions," "application," "applications," "instruction," "instructions," or "programming" are program(s) that execute functions defined in the programs. Various programming languages can be employed to create one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An artistic effect system comprising:
   an eyewear device including:
      a frame; and
      a depth-capturing camera supported by the frame, wherein:
         the depth-capturing camera includes at least two visible light cameras with overlapping fields of view, and
         the at least two visible light cameras includes a left visible light camera to capture a left raw image and a right visible light camera to capture a right raw image;
   an image display for presenting images, including an original image, wherein the original image is based on the left raw image, a left processed image, the right raw image, a right processed image, or combination thereof;
   an image display driver coupled to the image display to control the image display to present the original image;
   a user input device to receive an artistic effect selection from a user to apply an artistic effect as a photo filter or a photo lens to the presented original image;
   a memory;
   a processor coupled to the depth-capturing camera, the image display driver, the user input device, and the memory; and programming in the memory, wherein execution of the programming by the processor configures the artistic effect system to perform functions, including functions to:
  capture, via the depth-capturing camera, the left raw image and the right raw image;
  present, via the image display, the original image;
  receive, via the user input device, the artistic effect selection from the user to apply to the presented original image;
  generate, at least one artistic effect image with an artistic effect scene, by applying the artistic effect selection from the user to: (i) the left raw image or the left processed image to create a left artistic effect image, (ii) the right raw image or the right processed image to create a right artistic effect image, or (iii) combination thereof; and
  present, via the image display, the artistic effect image.

2. The artistic effect system of claim 1, wherein the functions further include a function to:
  calculate an image disparity map between a left pixel matrix of pixels and a right pixel matrix of pixels,
  each pixel is associated with a respective vertex of a matrix of vertices;
  each vertex has a position attribute;
  the position attribute of each vertex is based on a three-dimensional location coordinate system and includes an X location coordinate on an X axis for horizontal position, a Y location coordinate on a Y axis for vertical position, and a Z location coordinate on a Z axis for a depth position; and
  the function of applying the artistic effect selection from the user to: (i) the left raw image or the left processed image to create the left artistic effect image, (ii) the right raw image or the right processed image to create the right artistic effect image, or (iii) combination thereof is based on the Z location coordinate to vary a filtering effect strength of an artistic effect function to transform each pixel depending on the depth position of the respective vertex associated with each pixel.

3. The artistic effect system of claim 2, wherein:
  the filtering effecting strength is applied more strongly to the respective vertex having the Z location coordinate with a deeper depth position on the Z axis compared to having a shallower depth position on the Z axis.

4. The artistic effect system of claim 1, wherein the function to generate the at least one artistic effect image includes a function to:
  apply an artistic style or a popular art selection to: (i) the left raw image or the left processed image to create a left artistic effect image, (ii) the right raw image or the right processed image to create a right artistic effect image, or (iii) combination thereof.

5. The artistic effect system of claim 1, wherein the function to generate the at least one artistic effect image includes functions to:
  learn a style from the artistic selection using a deep neural network; and
  apply the learned style to (i) the left raw image or the left processed image to create a left artistic effect image, (ii) the right raw image or the right processed image to create a right artistic effect image, or (iii) combination thereof.

6. The artistic effect system of claim 5, wherein the artistic selection is one or more of a painting, a graphic, or a theme.

7. The artistic effect system of claim 1, wherein:
the user input device includes:
  a touch sensor including an input surface and a sensor array that is coupled to the input surface to receive at least one finger contact inputted from a user; and
  a sensing circuit integrated into or connected to the touch sensor and connected to the processor, the sensing circuit configured to track the at least one finger contact on the input surface;
the function of receiving, via the user input device, the artistic effect selection from the user includes receiving, on the input surface of the touch sensor, the at least one finger contact inputted from the user.

8. The artistic effect system of claim 7, further comprising:
  a chunk integrated into or connected to the frame on lateral side of the eyewear device; and
  a temple extending from the chunk;
  wherein:
    the frame, the temple, or the chunk includes a circuit board that includes the touch sensor;
    the circuit board includes a flexible printed circuit board;
    the touch sensor is disposed on the flexible printed circuit board;
    the sensor array is a capacitive array or a resistive array; and
    the capacitive array or the resistive array includes a grid that forms a two-dimensional rectangular coordinate system to track X and Y axes location coordinates.

9. The artistic effect system of claim 1, wherein:
the processor comprises a first processor and a second processor;
the memory comprises a first memory and a second memory;
the eyewear device includes:
  a first network communication interface for communication over a network;
  the first processor coupled to the first network communication interface;
  the first memory accessible to the first processor; and
  programming in the first memory, wherein execution of the programming by the first processor configures the eyewear device to perform the function to capture, via the depth-capturing camera, the left raw image and the right raw image; and
the artistic effect system further comprises a host computer coupled to the eyewear device over the network, the host computer including:
  a second network communication interface for communication over the network;
  the second processor coupled to the second network communication interface;
  the second memory accessible to the second processor; and
  programming in the second memory, wherein execution of the programming by the second processor configures the host computer to perform the functions to:
    receive, via the second network communication interface, the original image over the network from the eyewear device;
    present, via the image display, the original image;
    receive, via the user input device, the artistic effect selection;
    create the artistic effect image;
    generate the artistic effect image; and
    present, via the image display, the artistic effect image.

10. An artistic effect method comprising steps of:
capturing, via a depth-capturing camera, a left raw image and a right raw image;
presenting, via an image display, an original image, wherein the original image is based on the left raw image, a left processed image, the right raw image, a right processed image, or combination thereof;
receiving, via a user input device, an artistic effect selection from a user to apply to the presented original image;
generating at least one artistic effect image with an artistic effect scene by applying the artistic effect selection from the user to: (i) the left raw image or the left processed image to create a left photo filter image, (ii) the right raw image or the right processed image to create a right photo filter image, or (iii) combination thereof; and
presenting, via the image display, the at least one artistic effect image.

11. The artistic effect method of claim 10, further comprising:
calculating an image disparity map between a left pixel matrix of pixels and a right pixel matrix of pixels;
each pixel is associated with a respective vertex of a matrix of vertices;
each vertex has a position attribute;
the position attribute of each vertex is based on a three-dimensional location coordinate system and includes an X location coordinate on an X axis for horizontal position, a Y location coordinate on a Y axis for vertical position, and a Z location coordinate on a Z axis for a depth position;
wherein applying the artistic effect selection from the user to: (i) the left raw image or the left processed image to create the left artistic effect image, (ii) the right raw image or the right processed image to create the right artistic effect image, or (iii) combination thereof is based on the Z location coordinate to vary a filtering effect strength of an artistic effect function to transform each pixel depending on the depth position of the respective vertex associated with each pixel.

12. The artistic effect method of claim 11, wherein the applying step comprises:
applying the filtering effecting strength more strongly to the respective vertex having the Z location coordinate with a deeper depth position on the Z axis compared to having a shallower depth position on the Z axis.

13. The artistic effect method of claim 10, wherein generating the at least one artistic effect image includes:
applying an artistic style or a popular art selection to: (i) the left raw image or the left processed image to create a left artistic effect image, (ii) the right raw image or the right processed image to create a right artistic effect image, or (iii) combination thereof.

14. The artistic effect method of claim 10, wherein generating the at least one artistic effect image includes:
learning a style from the artistic selection using a deep neural network; and
applying the learned style to (i) the left raw image or the left processed image to create a left artistic effect image, (ii) the right raw image or the right processed image to create a right artistic effect image, or (iii) combination thereof.

15. The artistic effect method of claim 14, wherein the artistic selection is one or more of a painting, a graphic, or a theme.

16. A non-transitory computer readable medium including instructions for configuring an artistic effect system including an eyewear device having a depth-capturing camera, an image display, a user input device, and a processor, the instructions, when executed by the processor configuring the artistic effect system to:
capture, via the depth-capturing camera, a left raw image and a right raw image;
present, via the image display, an original image, wherein the original image is based on the left raw image, a left processed image, the right raw image, a right processed image, or combination thereof;
receive, via the user input device, an artistic effect selection from a user to apply to the presented original image;
generate, at least one artistic effect image with an artistic effect scene, by applying the artistic effect selection from the user to: (i) the left raw image or the left processed image to create a left artistic effect image, (ii) the right raw image or the right processed image to create a right artistic effect image, or (iii) combination thereof; and
present, via the image display, the artistic effect image.

17. The medium of claim 16, the instructions, when executed by the processor further configuring the artistic effect system to:
calculate an image disparity map between a left pixel matrix of pixels and a right pixel matrix of pixels;
each pixel is associated with a respective vertex of a matrix of vertices;
each vertex has a position attribute;
the position attribute of each vertex is based on a three-dimensional location coordinate system and includes an X location coordinate on an X axis for horizontal position, a Y location coordinate on a Y axis for vertical position, and a Z location coordinate on a Z axis for a depth position;
wherein applying the artistic effect selection from the user to: (i) the left raw image or the left processed image to create the left artistic effect image, (ii) the right raw image or the right processed image to create the right artistic effect image, or (iii) combination thereof is based on the Z location coordinate to vary a filtering effect strength of an artistic effect function to transform each pixel depending on the depth position of the respective vertex associated with each pixel.

18. The medium of claim 17, wherein applying the filtering effect comprises applying the filtering effecting strength more strongly to the respective vertex having the Z location coordinate with a deeper depth position on the Z axis compared to having a shallower depth position on the Z axis.

19. The medium of claim 16, wherein, to generate the at least one artistic effect image, the instructions, when executed by the processor, configure the artistic effect system to:
apply an artistic style or a popular art selection to: (i) the left raw image or the left processed image to create a left artistic effect image, (ii) the right raw image or the right processed image to create a right artistic effect image, or (iii) combination thereof.

20. The medium of claim 16, wherein, to generate the at least one artistic effect image, the instructions, when executed by the processor, configure the artistic effect system to:
learn a style from the artistic selection using a deep neural network; and apply the learned style to (i) the left raw image or the left processed image to create a left artistic effect image, (ii) the right raw image or the right processed image to create a right artistic effect image, or (iii) combination thereof.

* * * * *